(12) United States Patent
Angelov et al.

(10) Patent No.: US 10,296,787 B2
(45) Date of Patent: May 21, 2019

(54) INK FILE OUTPUT METHOD, OUTPUT DEVICE, AND PROGRAM

(71) Applicant: Wacom Co., Ltd., Saitama (JP)

(72) Inventors: Branimir Angelov, Sofia (BG); Yoichi Miura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 157 days.

(21) Appl. No.: 15/084,297

(22) Filed: Mar. 29, 2016

(65) Prior Publication Data

US 2016/0292500 A1 Oct. 6, 2016

Related U.S. Application Data

(63) Continuation of application No. PCT/JP2015/060076, filed on Mar. 31, 2015.

(51) Int. Cl.
*G06K 9/00* (2006.01)
*G06F 3/0354* (2013.01)
*G06F 3/041* (2006.01)
*G06K 9/22* (2006.01)

(52) U.S. Cl.
CPC ..... *G06K 9/00416* (2013.01); *G06F 3/03545* (2013.01); *G06F 3/041* (2013.01); *G06F 3/0416* (2013.01); *G06K 9/222* (2013.01); *G06F 2203/0382* (2013.01)

(58) Field of Classification Search
CPC .. G06K 9/222; G06K 9/0416; G06F 3/03545; G06F 3/041
See application file for complete search history.

(56) References Cited

U.S. PATENT DOCUMENTS

| | | | |
|---|---|---|---|
| 6,055,332 A * | 4/2000 | Aitani | G06K 9/00429 382/181 |
| 7,057,615 B2 | 6/2006 | Wang et al. | |
| 7,397,949 B2 * | 7/2008 | Dresevic | G06F 17/241 345/179 |
| 7,450,125 B2 | 11/2008 | Wang et al. | |
| 9,465,942 B1 * | 10/2016 | Kane-Parry | G06F 21/57 |

(Continued)

FOREIGN PATENT DOCUMENTS

JP 2003-141100 A 5/2003
WO 2015019883 A1 2/2015

OTHER PUBLICATIONS

Yi-Min Chee et al., "Ink Markup Language (InkML) W3C Recommendation Sep. 20, 2011," [online], Sep. 20, 2011, W3C, [retrieved on Nov. 19, 2014], on the Internet <URL: http://www.w3.org/TR/InkML/>.

(Continued)

*Primary Examiner* — Howard Cortes
(74) *Attorney, Agent, or Firm* — Seed IP Law Group LLP

(57) ABSTRACT

An ink file output method is provided, which includes: generating M (M is an integer of 1 or more) pieces of stroke data SD on the basis of event data generated as M input devices move, respectively; generating N (N is an integer of 1 or more and M or less) kinds of logical names LN (metadata) identifying the M number of input devices; generating a metadata block associating the M pieces of stroke data SD with the N kinds of logical names LN; and writing the M pieces of stroke data SD and the metadata block to an ink file.

20 Claims, 26 Drawing Sheets

(56) References Cited

U.S. PATENT DOCUMENTS

| | | | |
|---|---|---|---|
| 2001/0056442 A1* | 12/2001 | Dresevic | G06F 17/211 715/203 |
| 2002/0071607 A1* | 6/2002 | Kawamura | G06K 9/222 382/187 |
| 2003/0229859 A1 | 12/2003 | Shiraishi et al. | |
| 2004/0140965 A1* | 7/2004 | Wang | G06F 3/0317 345/179 |
| 2005/0114799 A1* | 5/2005 | Rossler | G06K 9/00973 715/864 |
| 2005/0207369 A1* | 9/2005 | Bolourchi | H03M 13/09 370/320 |
| 2006/0013484 A1* | 1/2006 | Kono | G06K 9/033 382/181 |
| 2006/0290698 A1 | 12/2006 | Wang et al. | |
| 2007/0139399 A1* | 6/2007 | Cook | G06F 3/03545 345/179 |
| 2010/0279675 A1* | 11/2010 | Slack | G06F 9/4843 455/419 |
| 2011/0060622 A1* | 3/2011 | Piersol | G06F 11/1474 707/637 |
| 2011/0169756 A1* | 7/2011 | Ogawa | G06F 3/03545 345/173 |
| 2012/0013555 A1 | 1/2012 | Maeda et al. | |
| 2012/0262478 A1* | 10/2012 | Mukai | G06F 3/14 345/619 |
| 2013/0173765 A1* | 7/2013 | Korbecki | H04N 21/42209 709/221 |
| 2014/0118314 A1* | 5/2014 | Black | G06F 3/03545 345/179 |

OTHER PUBLICATIONS

"Ink Serialized Format Specification," [online], Microsoft Corporation, [retrieved on Dec. 11, 2014], on the Internet <URL: http://download.microsoft.com/download/0/B/E/0BE8BDD7-E5E8-422A-ABFD- 4342ED7AD886/InkSerializedFormat(ISF)Specification.pdf>.

Erik Dahlstrom et al., "Scalable Vector Graphics (SVG) 1.1 (Second Edition) W3C Recommendation Aug. 16, 2011," [online], Aug. 16, 2011, W3C, [retrieved on Dec. 11, 2014], on the Internet <URL: http://www.w3.org/TR/SVG/>.

Ian Hickson et al., "A vocabulary and associated APIs for HTML and XHTML W3C Recommendation Oct. 28, 2014," [online], Oct. 28, 2014, W3C, [retrieved on Dec. 11, 2014], on the Internet <URL: http://www.w3.org/TR/html5/>.

WDN Beta "Explanation of 'Wintab'," [online], Wacom Co., Ltd., [retrieved on Mar. 25, 2015], on the Internet <URL: http://wdnet.jp/library/windows/wintab/>.

Extended European Search Report, dated Oct. 29, 2018, for European Application No. 15887553.4-1221 / 3279774, 14 pages.

\* cited by examiner

FIG. 8A
M_Tbl
| LIDs | LNs |
|---|---|
| ... | ... |
| 0x001 0080127801BCF | David Smith |
| 0x001 0080127903BEF | David Smith |
| ... | ... |
| 0x002 0DEDBA3DB5080 | Greg Nelson |
| ... | ... |
FIG. 8B
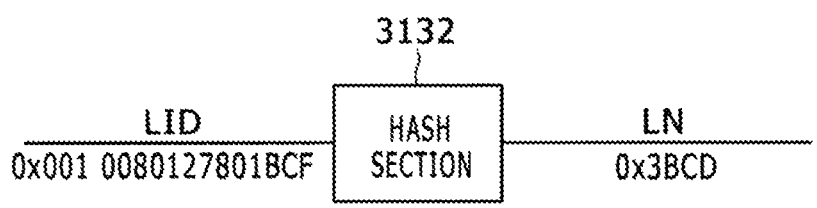
FIG. 8C
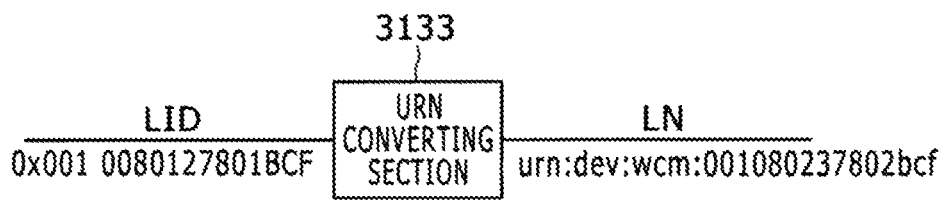

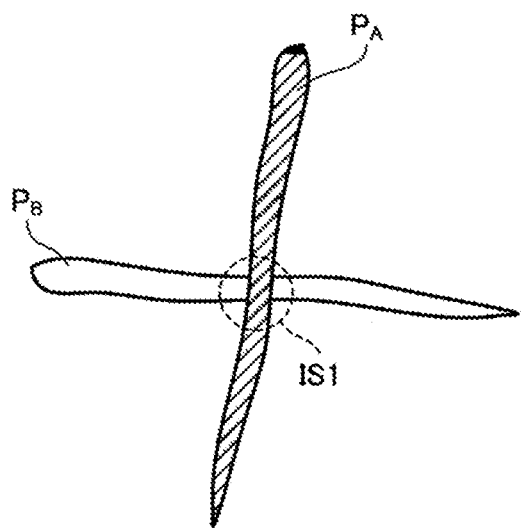
FIG. 10A
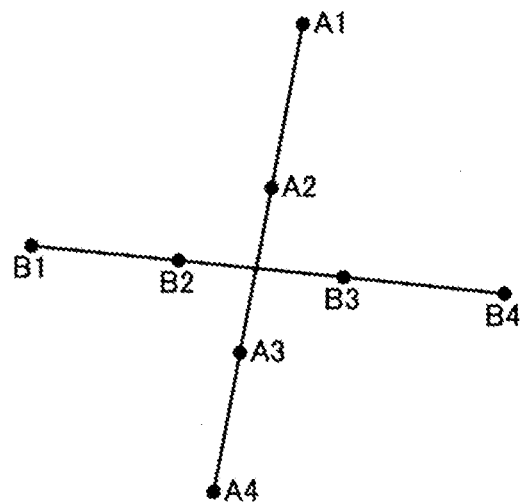
FIG. 10B
ELECTRONIC PEN $P_A$
| PD | Uorder(PID) |
|---|---|
| A1 | 0 |
| A2 | 0 |
| A3 | 2 |
| A4 | 2 |
ELECTRONIC PEN $P_B$
| PD | Uorder(PID) |
|---|---|
| B1 | 1 |
| B2 | 1 |
| B3 | 1 |
| B4 | 1 |
FIG. 10C

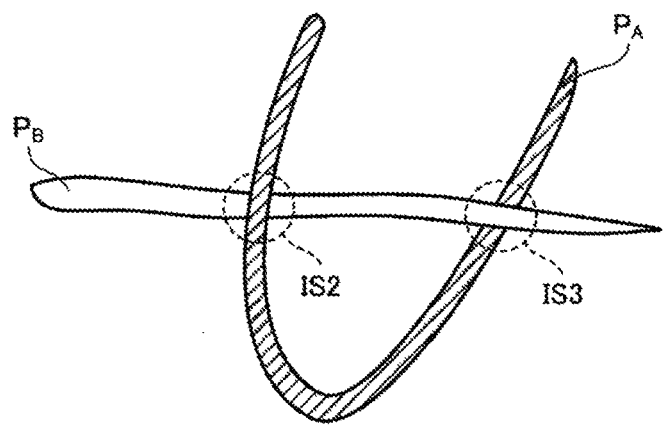
FIG. 11A
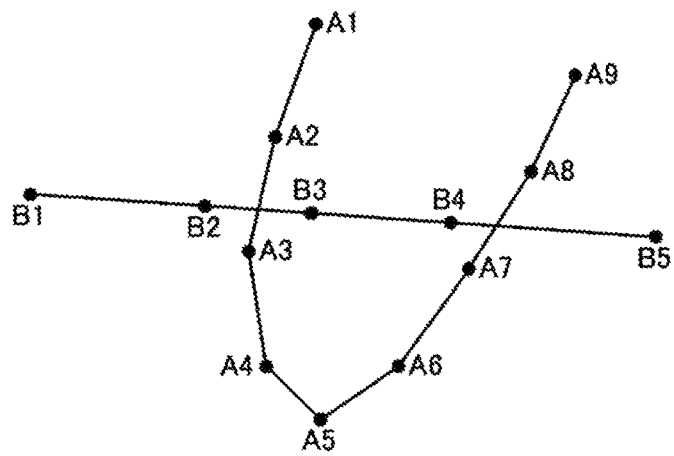
FIG. 11B
| ELECTRONIC PEN P_A | |
|---|---|
| PD | Uorder(PID) |
| A1 | 0 |
| A2 | 0 |
| A3 | 2 |
| A4 | 2 |
| A5 | 2 |
| A6 | 2 |
| A7 | 2 |
| A8 | 2 |
| A9 | 2 |
| ELECTRONIC PEN P_B | |
|---|---|
| PD | Uorder(PID) |
| B1 | 1 |
| B2 | 1 |
| B3 | 1 |
| B4 | 1 |
| B5 | 3 |
FIG. 11C

FIG. 12A

| STROKE IDENTIFIER Stroke_id(PID) | ORDER INFORMATION STORAGE UNIT | ORDER INFORMATION Uorder(PID) | POINT DATA | LOGICAL NAME LN |
|---|---|---|---|---|
| 1 | STROKE | 0 | ALL POINT DATA | LN1 |
| ... | ... | ... | ... | ... |
| 100 | STROKE | 99 | ALL POINT DATA | LN1 |
| 101 | STROKE SEGMENT | 100 | A1,A2 | LN1 |
| 101 | STROKE SEGMENT | 102 | A3,A4,A5,A6,A7,A8,A9 | LN1 |
| 102 | STROKE SEGMENT | 101 | B1,B2,B3,B4 | LN2 |
| 102 | STROKE SEGMENT | 103 | B5 | LN2 |
| 103 | STROKE | 104 | ... | ... |
| ... | ... | ... | ALL POINT DATA | LN2 |

FIG. 12B

| ORDER INFORMATION Uorder(PID) | STROKE IDENTIFIER Stroke_id(PID) | ORDER INFORMATION STORAGE UNIT | POINT DATA | LOGICAL NAME LN |
|---|---|---|---|---|
| 0 | 1 | STROKE | ALL POINT DATA | LN1 |
| ... | ... | ... | ... | ... |
| 99 | 100 | STROKE | ALL POINT DATA | LN1 |
| 100 | 101 | STROKE SEGMENT | A1,A2 | LN1 |
| 101 | 102 | STROKE SEGMENT | B1,B2,B3,B4 | LN2 |
| 102 | 101 | STROKE SEGMENT | A3,A4,A5,A6,A7,A8,A9 | LN1 |
| 103 | 102 | STROKE SEGMENT | B5 | LN2 |
| 104 | 103 | STROKE | ... | ... |
| ... | ... | ... | ALL POINT DATA | LN1 |

```
01: package strokefileformat;

02: message Document {
03:   repeated float viewBox = 1;
04:   optional Uint32 decimalPrecision = 2 [default = 2];
05:   repeated Style styles = 3;
06:   repeated Stroke strokes = 4;
07: }

08: message Style {
09:     optional float strokeWidth = 1 [default = 4];
10: }

11: message Stroke {
12:     repeated sint32 point           = 1;
13:     optional int32 stroke_id        = 2;
14: }
```

| KEY | VALUE |
|-----|-------|
| (4) | (k=1,V=O)(k=1,V=O) ⋯ (k=2,V=O) |

FIG. 17

SD0
```
<trace xml:id="sd0">
14 2 1.0, 13 33 1.0, 13 64 0.9, 13 91 0.9, 12 120 0.9, 12 152 0.8, 12 176 0.8, 13 207 0.7,
15 238 0.8, 15 268 0.7, 16 301 0.8, 16 334 0.7, 16 374 0.7, 13 414 0.6, 10 385 0.6, 12 351 0.6,
18 318 0.7, 25 288 0.7, 37 257 0.7, 51 231 0.9, 73 217 0.7, 98 237 0.7, 111 268 0.7, 118 297 0.6,
120 331 0.6, 119 373 0.5
</trace>
```

SD1
```
<trace xml:id="sd1">
199 306 1.0, 227 305 1.0, 247 290 0.9, 262 270 0.9, 269 239 0.9, 242 220 0.8, 210 235 0.8,
189 260 0.7, 175 290 0.8, 168 322 0.7, 167 357 0.8, 174 389 0.7, 199 410 0.7, 239 400 0.6,
280 366 0.6
</trace>
```

SD2
```
<trace xml:id="sd2">
367 309 0.7, 379 275 0.7, 387 246 0.8, 396 211 0.9, 402 174 0.8, 408 139 0.9, 410 102 0.8,
400 68 0.7, 380 93 0.8, 370 124 0.7, 360 162 0.8, 354 202 0.7, 345 247 0.7, 343 284 0.6,
340 321 0.6, 342 359 0.6, 354 396 0.7, 382 404 0.7, 411 388 0.7, 444 359 0.5
</trace>
```

SD3
```
<trace xml:id="sd3">
489 290 0.7, 502 250 0.7, 510 217 0.8, 518 175 0.9, 523 138 0.8, 530 100 0.9, 531 62 0.8,
522 32 0.7, 504 64 0.8, 493 101 0.7, 482 145 0.8, 474 193 0.7, 466 238 0.7, 461 290 0.6,
457 337 0.6, 471 386 0.6, 511 373 0.7, 543 347 0.7
</trace>
```

SD4
```
<trace xml:id="sd4">
615 227 0.7, 604 260 0.7, 602 292 0.8, 617 329 0.9, 648 344 0.8, 674 328 0.9,
690 297 0.8, 689 258 0.7, 660 247 0.8
</trace>
```

FIG.19

```
<x:xmpmeta xmlns:x="adobe:ns:meta/">
  <rdf:RDF xmlns:rdf="http://www.w3.org/1999/02/22-rdf-syntax-ns#">
    <rdf:Description rdf:about="" xmlns:will="http://www.wacom.com/will/meta/groups/" xmlns:dc="http://purl.org/dc/elements/1.1/">
      <will:GroupList>
        <rdf:Bag>
          <rdf:li rdf:parseType="Resource">
            <will:Elements>
              <rdf:Bag>
                <rdf:li rdf:parseType="Resource">
                  <will:Range will:from="element(/1/1)" will:to="element(/1/5)" />      B1b
                </rdf:li>
              </rdf:Bag>
            </will:Elements>
  B1 ─      <will:Extensions rdf:parseType="Resource">
              <dc:creator>
                <rdf:Seq>
                  <rdf:li>David Smith</rdf:li>
                </rdf:Seq>                  B1a
              </dc:creator>
            </will:Extensions>
          </rdf:li>

<rdf:li rdf:parseType="Resource">
            <will:Elements>
              <rdf:Bag>
                <rdf:li rdf:parseType="Resource">
                  <will:Range will:from="element(/1/6)" will:to="element(/1/9)" />      B2b
                </rdf:li>
              </rdf:Bag>
            </will:Elements>
  B2 ─      <will:Extensions rdf:parseType="Resource">
              <dc:creator>
                <rdf:Seq>
                  <rdf:li>Greg Nelson</rdf:li>
                </rdf:Seq>                  B2a
              </dc:creator>
            </will:Extensions>
          </rdf:li>
        </rdf:Bag>
      </will:GroupList>
    </rdf:Description>
  </rdf:RDF>
</x:xmpmeta>
```

| FILE NAME | ACCOUNT | LN | LID | FORMAT |
|---|---|---|---|---|
| #F1 | #AC1 | David Smith | Pid#1 | WILL |
| | | | Pid#2 | |
| | | Greg Nelson | Pid#3 | |
| #F2 | #AC1 | David Smith | Pid#1 | WILL |
| #F3 | #AC2 | Greg Nelson | Pid#3 | InkML |

FIG.28

| FILE NAME | ACCOUNT | LN | LID | FORMAT |
|---|---|---|---|---|
| #F1 | #AC1 | David Smith | Pid#1 | WILL |
| | | | Pid#2 | |
| | | Greg Nelson | Pid#3 | |
| #F2 | #AC1 | David Smith | Pid#1 | WILL |
| #F3 | #AC2 | Greg Nelson | Pid#3 | InkML |
| #F4 | #AC1 | David Smith | Pid#1 | WILL |
| | | | Pid#2 | |
| | #AC2 | Greg Nelson | Pid#3 | InkML |
| #F5 | #AC1 | David Smith | Pid#1 | WILL |
| | #AC2 | Greg Nelson | Pid#3 | InkML |
| ⋮ | ⋮ | ⋮ | ⋮ | ⋮ |

INK FILE OUTPUT METHOD, OUTPUT DEVICE, AND PROGRAM

TECHNICAL FIELD

The present invention relates to an ink file output method, an ink file output device, and an ink file output program, and particularly to an ink file output method, an ink file output device, and an ink file output program that can realize ink file reproduction processing depending on an input device.

BACKGROUND ART

An digital ink is known which makes it possible to retain, as vector data, a character or an image written on a position detector such as a tablet or the like by using an input device such as an electronic pen, a stylus, or the like, and later reproduce the character or the image. The digital ink is data formed by converting a trajectory of movement of the input device on the position detector into electronic data so as to imitate a handwriting trajectory (stroke) drawn on paper. The digital ink generally includes, for example: (1) data for reproducing the handwriting trajectory by a set of coordinate points, control points, and the like; (2) data describing a style of rendering the handwriting trajectory, such as color information, a pen point (pen tip) type, and the like; and (3) data describing a geometric conversion rule for data on the trajectory, such as a coordinate transformation matrix or the like. Several types of formats have been proposed as concrete formats of the digital ink, as disclosed in Non-Patent Documents 1 to 4 below, for example.

InkML described in Non-Patent Document 1 is a most widely known digital ink data format. In InkML, the "data for reproducing the handwriting trajectory" of (1) above is referred to as a <trace> element. The <trace> element describes a set of a plurality of pieces of point data constituting the trajectory of one stroke (operation from the bringing of an indicator in contact with a sensor surface of a position detecting device to the separation of the indicator from the sensor surface) (which data is detected at predetermined time intervals by the input sensor, and includes data representing attributes depending on the input sensor (input sensor attributes), such as point data (x, y), pen pressure data, time data, and the like). In addition, data such as a <brush> element or the like is defined as the "data specifying the trajectory rendering style" of (2) above. Data such as a <mapping> element or the like is defined as the "data describing the conversion rule for data on the trajectory" of (3) above. In addition, it is disclosed that an <inkSource> element allows description of a manufacturer, a model, a serial number, and the like of a hardware device that supplies the ink data.

ISF (Ink Serialized Format) described in Non-Patent Document 2 is a digital ink data format used in an application from Microsoft Corporation. The "data for reproducing the handwriting trajectory" of (1) above is referred to as StrokeDescriptorBlock in ISF. In StrokeDescriptorBlock, points for reproducing the trajectory of a stroke (which points are x- and y-coordinate values), a pen pressure value, and the like are described. DrawingAttributeBlock is defined as the "data specifying the trajectory rendering style" of (2) above. TransformBlock is defined as the "data describing the conversion rule for data on the trajectory" of (3) above.

SVG described in Non-Patent Document 3 is a markup language for describing a set of a two-dimensional graphics application, an image, and a graphic script. In SVG, there is a <path> element as the "data for reproducing the handwriting trajectory" of (1) above. The <path> element includes a plurality of control points (coordinate data) used for curve interpolation. A trajectory is reproduced by a Bezier curve based on the plurality of control points.

HTML5 described in Non-Patent Document 4 defines a data type referred to as a Canvas Path class as the "data for reproducing the handwriting trajectory" of (1) above. In the Canvas Path class, control points are given, which are necessary to generate a cubic curve for generating each segment, in reproducing a trajectory by connecting segments of a plurality of Bezier curves.

Patent Document 1, below, describes a technology related to compression of a digital ink. In order to compress a data amount of raw data obtained by coordinate detection while handwriting is performed, the number of pieces of necessary point data is reduced by using a curve interpolation algorithm, and the data is compressed.

In the following, the <trace> element in Non-Patent Document 1, StrokeDescriptorBlock in Non-Patent Document 2, the <path> element in Non-Patent Document 3, the Canvas Path class described in Non-Patent Document 4, the compressed digital ink in Patent Document 1, and the like will be referred to collectively as stroke data, which are vector data for reproducing a handwriting trajectory input by using a position detector based on a series of pieces of point data.

Some input devices such as electronic pens or the like retain unique identification information such as so-called pen identification information PID or the like. An input device of this kind internally includes a ROM storing unique identification information, and is configured to be able to output the unique identification information to a position detector such as a tablet or the like.

The pen identification information PID obtained by the position detector can be obtained from an application through a driver or a library API corresponding to a function of the position detector. Non-Patent Document 5, below, describes an example of a driver or a library API referred to as wintab. Section C.4 of the document describes specifications of UniqueID as the pen identification information PID output by an API referred to as wintab in a case where Intuos (registered trademark), which is a position detector from Wacom, is used as the position detector.

PRIOR ART DOCUMENTS

Patent Documents

Patent Document 1: Japanese Patent Laid-open No. 2003-141100
Patent Document 2: PCT International Patent Publication No. WO2015/019883

Non-Patent Documents

Non-Patent Document 1: Yi-Min Chee and 11 others, "Ink Markup Language (InkML) W3C Recommendation 20 Sep. 2011," [online], Sep. 20, 2011, W3C, [retrieved on Nov. 19, 2014], on the Internet <URL: http://www.w3.org/TR/InkML/>
Non-Patent Document 2: "Ink Serialized Format Specification," [online], Microsoft Corporation, [retrieved on Dec. 11, 2014], on the Internet <URL: http://download.microsoft.com/download/0/B/E/0BE8BDD7-E5E8-422A-ABFD-4342ED7AD886/InkSerializedFormat(ISF)Specification.pdf>

Non-Patent Document 3: Erik Dahlstrom and nine others, "Scalable Vector Graphics (SVG) 1.1 (Second Edition) W3C Recommendation 16 Aug. 2011," [online], Aug. 16, 2011, W3C, [retrieved on Dec. 11, 2014], on the Internet <URL: http://www.w3.org/TR/SVG/>

Non-Patent Document 4: Ian Hickson and six others, "A vocabulary and associated APIs for HTML and XHTML W3C Recommendation 28 Oct. 2014," [online], Oct. 28, 2014, W3C, [retrieved on Dec. 11, 2014], on the Internet <URL: http://www.w3.org/TR/html5/>

Non-Patent Document 5: WDN Beta "Explanation of 'Wintab'," [online], Wacom Co., Ltd., [retrieved on Mar. 25, 2015], on the Internet <URL: http://wdnet.jp/library/windows/wintab/>

SUMMARY OF INVENTION

Technical Problems

A digital ink is generally stored in the form of a file including a plurality of pieces of stroke data. At a time of reproduction, stroke data within one file is reproduced collectively. However, there may be a case where different input devices are used to input a plurality of pieces of stroke data included in one file (hereinafter referred to as an "ink file"). There is for example a case where a plurality of users accumulate stroke data on one canvas by using input devices held by the respective users. In addition, use of digital ink data has not yet been widely spread at present, and applications of users often do not support the format of stroke data. In such a case, it is convenient if stroke data processing can be performed according to an input device. For example, it would be convenient to be able to determine whether or not stroke data written by a particular input device is included in an ink file before decoding the stroke data, or to select and display only stroke data input by a particular input device. However, stroke data processing depending on an input device cannot be realized by the conventional technology.

It is accordingly an aspect of the present invention to provide an ink file output method, an ink file output device, and an ink file output program that can realize stroke data decoding or reproduction processing according to (depending on) a particular type of input device.

Conventionally, an ink file including a plurality of pieces of stroke data stores each piece of stroke data in association with its order among stroke units, such as ascending order of timing at which writing of each stroke unit has started. When the ink file is reproduced, the order of the reproduction is determined in stroke units, and each piece of stroke data is reproduced (rendered) in the determined order. However, with the conventional storage and reproduction, it is not possible to reproduce a complex before-and-after relation, such as when a plurality of pieces of stroke data are generated simultaneously while intersecting each other a plurality of times and while changing the before-and-after relation among themselves. Therefore an improvement has been desired in this regard.

It is accordingly another aspect of the present invention to provide an ink file output method, an ink file output device, and an ink file output program that can reproduce a complex before-and-after relation between a plurality of pieces of stroke data.

In addition, for pen identification information PID, there are various formats other than the format described in the above-described Non-Patent Document 5. Some electronic pens are capable of outputting pen identification information as described above, while other electronic pens do not have a function of sending out the information, such as passive touch pens, mouse devices, and the like. Also, there are various policies of users in relation to the disclosure of pen identification information PID. For example, as is the case with a user who is reluctant to allow disclosure of the IMEI (International Mobile Equipment Identifier) of the user's mobile terminal, a MAC address given to the network interface of the terminal, or the like, there are users who are reluctant to allow the pen identification information associated with the pen to be included in ink data and disclosed. In addition, as in a case where a URL is used in place of an IP address on the Internet, some users may prefer to use a character string obtained by converting the pen identification information into a name as the pen identification information, as opposed to a row of numerical values.

However, the ink data output methods in the past simply output the value of pen identification information PID in one format, from a driver corresponding to a position detector of one vendor, without any processing to be included in ink data. Hence, when a user, who is as an application developer, develops an application program that utilizes pen identification information PID with the use of a library, in which a conventional ink data output method is implemented, another library needs to be used to provide the pen identification information in another format.

Accordingly, it is yet another aspect of the present invention to provide an ink file output method, an ink file output device, and an ink file output program that can include pen identification information or information corresponding to the pen identification information while dealing with a difference in formats of the pen identification information PID, the presence or absence of the capability of sending out the pen identification information, or the preferences of a user in relation to the disclosure of the pen identification information.

Technical Solution

A method of outputting an ink file according to an embodiment of the present invention includes: a step of generating stroke data on a basis of event data generated as an input device moves; a step of generating metadata identifying the input device; a step of generating a metadata block associating the metadata with the stroke data; and a step of writing the stroke data and the metadata block to the ink file.

According to an ink file output method according to another aspect of the present invention, in the above-described method of outputting the ink file, the step of generating the stroke data generates a plurality of pieces of stroke data, wherein the plurality of pieces of stroke data each store a plurality of pieces of point data. Further, order information is stored in association with each of the plurality of pieces of point data, wherein the order information is information indicating relative rendering order between the plurality of pieces of point data stored in the respective plurality of pieces of stroke data.

According to an ink file output method according to yet another aspect of the present invention, the metadata is information formed by applying a predetermined conversion to input device identification information prestored in the input device.

In addition, a device for outputting an ink file according to an embodiment of the present invention includes: a stroke data generator configured to generate stroke data on a basis of event data generated as an input device moves; a metadata generator configured to generate metadata identifying the input device; and an ink file generator configured to generate a metadata block associating the metadata with the stroke data, and to write the stroke data and the metadata block to the ink file.

In addition, an ink file output program according to an embodiment of the present invention is a program, when executed on a computer, causes the computer to operate as an ink file output device. The program causes the computer to: generate stroke data on a basis of event data generated as an input device moves; generate metadata identifying the input device; and generate a metadata block associating the metadata with the stroke data, and write the stroke data and the metadata block to the ink file.

Advantageous Effects

According to exemplary embodiments of the present invention, when an ink file is reproduced, device information identifying an input device (device information is, for example, a character string obtained by converting pen identification information stored in the input device in advance) and stroke data can be associated with each other on the basis of information written within the ink file. It is therefore possible to realize ink file reproduction processing that depends on the input device.

In addition, according to another aspect of the present invention, complex before-and-after relation between a plurality of pieces of stroke data (SD) can be reproduced by rendering each coordinate according to the rendering order represented by the order information.

In addition, according to another aspect of the present invention, by once converting pen identification information (PID) in a different format into logical identification information (LID), it is possible to output the logical identification information in association with a logical name from an application on the basis of a table (M_Tbl) generated in a single format. This enables an application developer to simply develop an application that outputs, in a state of being included in ink data, pen identification information or information corresponding to the pen identification information that meets the preferences of a user in relation to the disclosure of the pen identification information, with the use of one kind of table without being aware of the difference in formats of the pen identification information PID.

BRIEF DESCRIPTION OF DRAWINGS

FIG. 8A is a diagram showing an example of logical identification information LID and logical names LN in a case where the logical names LNs are character strings, FIG. 8B is a diagram showing an example of logical identification information LID and a logical name LN in a case where the logical name LN is a hash value, and FIG. 8C is a diagram showing an example of logical identification information LID and a logical name LN in a case where the logical name LN is a URN.

FIG. 10A is a diagram showing an example of figures drawn by two electronic pens $P_A$ and $P_B$, respectively, FIG. 10B is a diagram formed by replacing FIG. 10A with discrete point data, and FIG. 10C is a diagram showing order information Uorder(PID) associated with the series of coordinates shown in FIG. 10B.

FIG. 11A is a diagram showing another example of figures drawn by two electronic pens $P_A$ and $P_B$, respectively, FIG. 11B is a diagram formed by replacing FIG. 11A with discrete point data, and FIG. 11C is a diagram showing order information Uorder(PID) associated with the series of coordinates shown in FIG. 11B.

FIG. 12A is a diagram illustrating a series of pieces of information stored within one ink file including the stroke data shown in FIG. 11, and FIG. 12B shows a result of sorting the series of pieces of information shown in FIG. 12A based on order information Uorder(PID).

FIG. 17 is a diagram showing an example of stroke data described in an InkML format.

FIG. 19 is a diagram showing an example of a metadata chunk described in an XMP format.

FIG. 28 is a diagram showing an example of an ink table stored in a storage 71 shown in FIG. 27.

MODES FOR CARRYING OUT THE INVENTION

Preferred embodiments of the present invention will hereinafter be described in detail with reference to the accompanying drawings.

Figure 1:
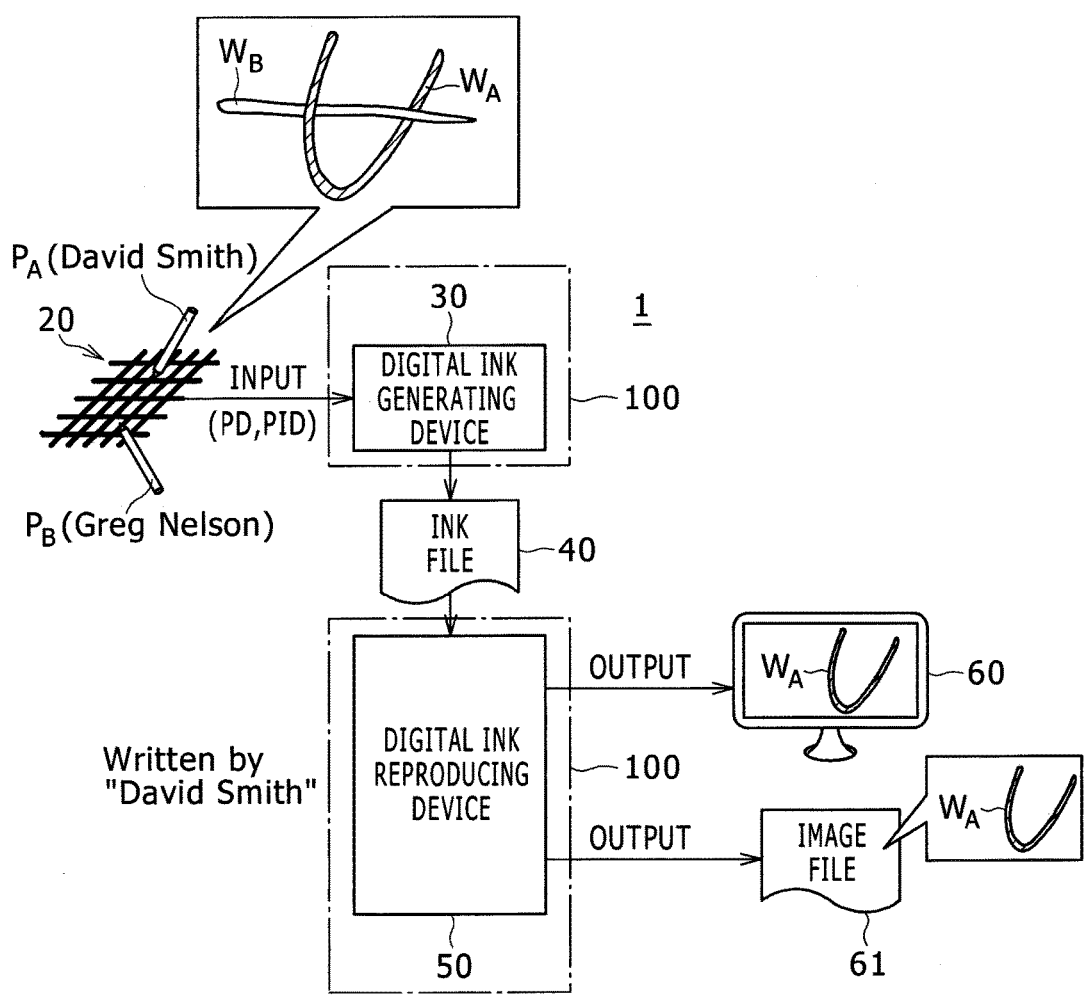
FIG. 1 is a diagram showing a system configuration of a computer 1 according to a first embodiment of the present invention.

A method of outputting an ink file according to a first embodiment of the present invention will first be described. FIG. 1 is a diagram showing a system configuration of a computer 1 that realizes the method of outputting an ink file according to an embodiment of the present embodiment. As shown in the figure, the computer 1 includes a position detector 20, a digital ink generating device 30 (ink file output device), a digital ink reproducing device 50, and a display 60. The computer 1 may be a device into which all of these configurations are integrated, or may be a device formed with a portion of these configurations coupled as an external device to another configuration. Examples of the former include a case where the computer 1 is a so-called tablet PC. Examples of the latter include an example in which the main unit of the computer 1 is a personal computer, and the position detector 20 and the display 60 are coupled as external devices to the personal computer. In either case, the computer 1 has the configuration (not shown) of an ordinary computer, which includes a CPU, a communication circuit, a storage device, and the like. The storage device includes a main storage device such as a main memory or the like and an auxiliary storage device such as a hard disk or the like. Each function of the computer 1 is implemented by the operation of the CPU according to a program stored in the storage device.

The position detector 20 is a device having a flat panel surface and a sensor disposed directly under the panel surface. The position detector 20 is used together with one or more electronic pens P. FIG. 1 illustrates two electronic pens $P_A$ and $P_B$ as an example of electronic pens P. The subscripts A and B added at the lower right of the reference characters of the electronic pens $P_A$ and $P_B$ are symbols for distinguishing the plurality of electronic pens from each other. In the present specification, when a plurality of electronic pens do not particularly need to be distinguished from each other, the plurality of electronic pens will be simply written as electronic pens P. The electronic pens $P_A$ and $P_B$ may be alternately used by one user. Alternatively, the electronic pens $P_A$ and $P_B$ may be used simultaneously by a plurality of users, as will be described later with reference to FIG. 10 and FIG. 11, and the electronic pens $P_A$ and $P_B$ may output strokes whose before-and-after (over-and-under) relation is partly changed (switched) as in a case of two strokes indicated by $W_A$ and $W_B$ in FIG. 1.

An electronic pen P is a pen-shaped input device. The electronic pen P is usually used in a state of being held by a hand of a user. The user inputs a character or a drawing by moving the pen point (pen tip) of the electronic pen P on the position detector 20. Though not shown in the figures, the electronic pen P includes: a storage device that stores pen identification information PID (input device identification information) unique to the electronic pen P in advance; a pen pressure detecting device that detects a force with which the electronic pen P presses the panel surface of the position detector 20, that is, a pen pressure; a side switch capable of assuming either an on state or an off state; and a transmitting device for transmitting various kinds of signals from the electronic pen P to the position detector 20. The signals transmitted by the transmitting device include a signal indicating the pen identification information PID, a signal indicating the pen pressure detected by the pen pressure detecting device, a signal indicating the state of the side switch, and the like. The transmitting device is configured to transmit these signals in fixed cycles.

The position detector 20 has a function of detecting the position of each electronic pen P within the panel surface and a function of receiving each piece of the above-described information transmitted by each electronic pen P. To detect the position of the electronic pen P, the sensor constituting the position detector 20 has a constitution, in which a plurality of linear conductors each extending in an x-direction (one direction within the surface of the position detector 20) and a plurality of linear conductors each extending in a y-direction (direction orthogonal to the x-direction within the surface of the position detector 20) are each arranged at equal intervals. The position detector 20 detects point data PD indicating the position of the electronic pen P within the panel surface on the basis of a change in potential of these linear conductors, wherein such change is caused by the electronic pen P approaching the panel surface. The point data PD is data constituted of a combination (x, y) of an x-coordinate and a y-coordinate. This detection is performed in the same cycles as the signal transmission cycles of the electronic pen P. The position detector 20 is coupled to the digital ink generating device 30 by an interface such as USB, $I^2C$, or the like. The position detector 20 is configured to output the detected point data PD at each time of detection and the received various kinds of information at each time of reception to the digital ink generating device 30 via the interface.

The digital ink generating device 30 is a device that generates an ink file 40 on the basis of the point data PD and the various kinds of information supplied from the position detector 20. The digital ink generating device 30 is implemented as a library dynamically or statically linked by an application 100, wherein the library is executed on the CPU of the computer 1, or as a service used by the application 100. Details of the ink file 40 will be described later. Briefly, the ink file 40 includes one or more pieces of stroke data, each including a series of pieces of point data PD for reproducing the movement trajectory of the electronic pen P and metadata (logical name LN to be described later) corresponding to the pen identification information PID of the electronic pen P used to generate the stroke data. The metadata is generated for each piece of stroke data, and is stored within the ink file 40 in association with the corresponding stroke data. The ink file 40 is stored in the storage device of the computer 1, though the storage device is not shown in the figures. The ink file 40 becomes an object to be uploaded to various servers, to be transmitted by electronic mail, or the like, as required.

The digital ink reproducing device 50 is a device that reproduces the ink file 40 generated by the digital ink generating device 30. As with the digital ink generating device 30, the digital ink reproducing device 50 may be implemented as a library dynamically or statically linked by the application 100, wherein the library is executed on the CPU of the computer 1, or as service. Specifically, the digital ink reproducing device 50 is configured to receive an instruction from the application 100, selectively extract and decode desired stroke data from the ink file 40, and perform processing of rendering the decoded stroke data, to thereby generate a video signal to be displayed on the display 60 or generate an image file 61 as raster data. The image file 61 is, for example, a JPEG or PNG file. The digital ink reproducing device 50 according to the present embodiment in particular has a function of extracting and decoding only stroke data generated by a particular electronic pen P by referring to the metadata within the ink file 40, and setting the stroke data generated by the particular electronic pen P as an object of rendering processing. This will be described later in detail.

Figure 2:
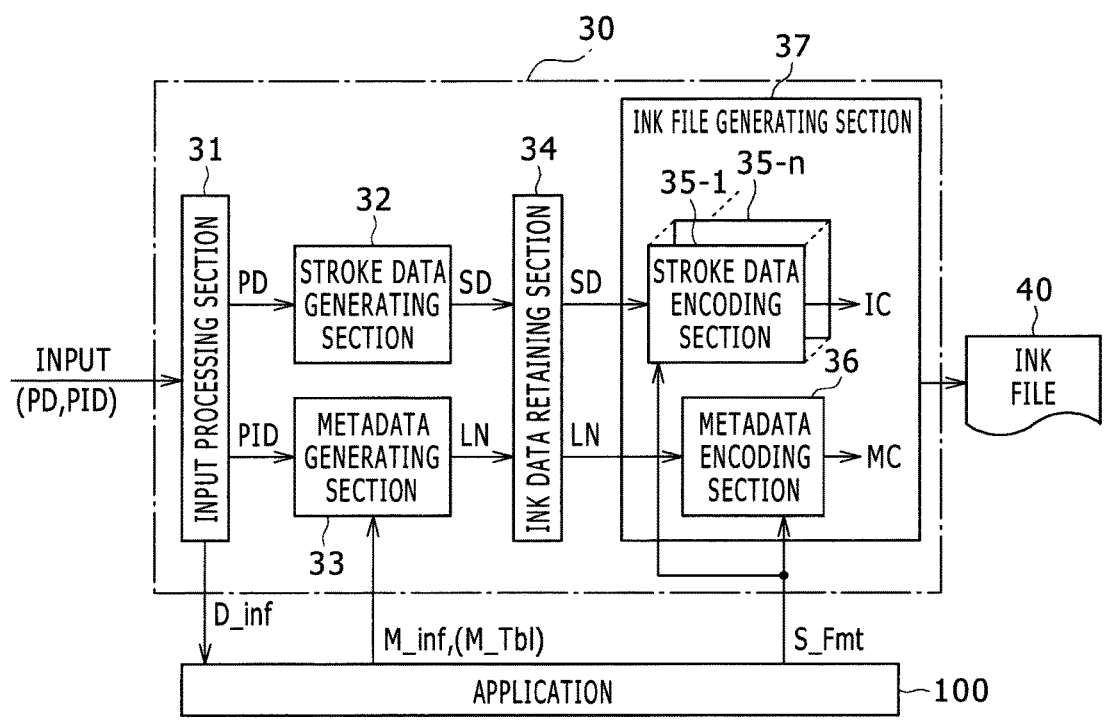
FIG. 2 is a functional block diagram of a digital ink generating device 30 shown in FIG. 1.

FIG. 2 is a functional block diagram of the digital ink generating device 30. As shown in the figure, the digital ink generating device 30 functionally includes an input processing section 31, a stroke data generating section 32, a metadata generating section 33, an ink data retaining section 34, and an ink file generating section 37. Of the constituent elements, the ink file generating section 37 includes, as an internal configuration thereof, a plurality of stroke data encoding sections 35-1 to 35-n and a metadata encoding section 36.

In this case, the application 100 shown in FIG. 2 is software executed on the CPU of the computer 1, and plays a role of controlling the operation of the computer 1, wherein the operation is related to the generation and reproduction of the ink file 40. The application 100 may be, for example, a handwriting notebook application, a presentation application, a whiteboard sharing application, or various other applications. The application 100 is configured to exchange various kinds of information, such as metadata information M_inf, a table M_Tbl, and the like to be described later, between the digital ink generating device 30 and the digital ink reproducing device 50 (see FIG. 1) via the memory of the computer 1.

The input processing section 31 is a functional unit that, each time the input processing section 31 receives various kinds of information (the point data PD, the pen identification information PID, the information indicating the pen pressure, the information indicating the state of the side switch, or the like) from the position detector 20, generates event data on the basis of the received information, and distributes and supplies the event data to the stroke data generating section 32, the metadata generating section 33, and the application 100. The input processing section 31 is typically implemented as a device driver corresponding to the position detector 20, wherein the device driver is included in an operating system operating on the computer 1. Data supplied from the input processing section 31 to the stroke data generating section 32 includes the point data PD. Data supplied to the metadata generating section 33 includes the pen identification information PID. Meanwhile, the application 100 is supplied with information D_inf indicating conditions of processing of stroke data SD. The application 100 is configured to control the operation of the digital ink generating device 30 according to the information D_inf.

The event data generated by the input processing section 31 includes not only the information supplied from the position detector 20 but also event type identification information ETYPE (not shown) indicating the state of the electronic pen P. The event type identification information ETYPE is information for identifying to which part in a series of strokes does a point indicated by the point data PD input from the position detector 20 belong. Though not shown in FIG. 2, the event type identification information ETYPE assumes a value of a pen-down state Pdown indicating that the electronic pen P is in contact with the panel surface, a pen-moved state Pmvd indicating that the electronic pen P is moved within the panel surface, a pen-up state Pup indicating that the electronic pen P is separated from the panel surface, or the like.

The input processing section 31 is configured to be able to detect that the electronic pen P is in contact with the position detector 20 (pen-down) and that the electronic pen P is separated from the position detector 20 (pen-up) on the basis of the information received from the position detector 20. When the input processing section 31 detects that the electronic pen P is in contact with the position detector 20 (pen-down), the input processing section 31 sets the value of the event type identification information ETYPE to the pen-down state Pdown in the event data to be next generated. Thereafter, while the electronic pen P is in contact with the panel surface of the position detector 20 (that is, while various kinds of information continue to be supplied from the position detector 20), the input processing section 31 continues to set the pen-moved state Pmvd as the value of the event type identification information ETYPE within event data. Finally, when the input processing section 31 detects that the electronic pen P is separated from the position detector 20 (pen-up), the input processing section 31 sets the value of the event type identification information ETYPE to the pen-up state Pup in the event data to be generated next. The input processing section 31 thus generates a series of pieces of event data starting with the pen-down state Pdown and ending with the pen-up state Pup.

The stroke data generating section 32 is a functional unit, which is supplied with point data PD from the input processing section 31 and which generates stroke data SD including one or more pieces of point data PD. The stroke data generating section 32 is typically implemented by a program, which is referred to as a library or a service executed by the CPU of the computer 1. By referring to the value of the event type identification information ETYPE supplied from the input processing section 31, the stroke data generating section 32 generates one piece of stroke data SD including a series of pieces of point data PD included in each piece of event data, from event data indicating the pen-down state Pdown to event data indicating the pen-up state Pup.

In this case, there are various types of point data PD included in the stroke data SD. The stroke data generating section 32 may include, in the stroke data SD, the values of the point data PD supplied from the input processing section 31 as they are, or may include, in the stroke data SD, the values of the point data PD processed by performing smoothing processing such as a weighted mean, exponential smoothing, or the like, by performing thinning-out processing, or by performing compression processing as in the digital ink described in Patent Document 1, or the like. In addition, the position or two-dimensional vector of an external control point not present on the trajectory reproduced, used in determining the curve shape of an interpolation curve such as a Bezier curve or the like, may be added as a value of point data PD to the stroke data SD. The stroke data generating section 32 is configured to store the generated stroke data SD in the ink data retaining section 34.

The metadata generating section 33 is a functional unit that generates a logical name LN as metadata on the basis of pen identification information PID supplied from the input processing section 31. The metadata generating section 33 is also typically implemented by a program, which is referred to as a library or a service executed by the CPU of the computer 1. When event data supplied from the input processing section 31 includes event type identification information ETYPE indicating the pen-down state Pdown, the metadata generating section 33 generates a logical name LN corresponding to the pen identification information PID included in the event data. As shown in FIG. 8 to be described later, concrete contents of the logical name LN are described in one form selected by the application 100 from among three kinds of forms, such as a character string, a hash value, and a URN. The application 100 supplies the metadata generating section 33 with metadata information M_inf describing the output form of the logical name LN and a table M_Tbl describing a set of one or more pieces of logical identification information LID and the logical name LN described in a single format. The application 100 thereby selects the form of the logical name LN and specifies the logical name LN corresponding to each piece of logical identification information LID. The metadata generating section 33 is configured to store the generated logical name LN in the ink data retaining section 34.

The ink data retaining section 34 is configured to store the logical name LN supplied from the metadata generating section 33 and the stroke data SD supplied from the stroke data generating section 32 in association with each other. Specifically, the logical name LN supplied from the metadata generating section 33 in response to the bringing of a certain electronic pen P into the pen-down state Pdown and the stroke data SD supplied from the stroke data generating section 32 in response to the subsequent bringing of the electronic pen P into the pen-up state Pup are stored in association with each other.

Figure 14:
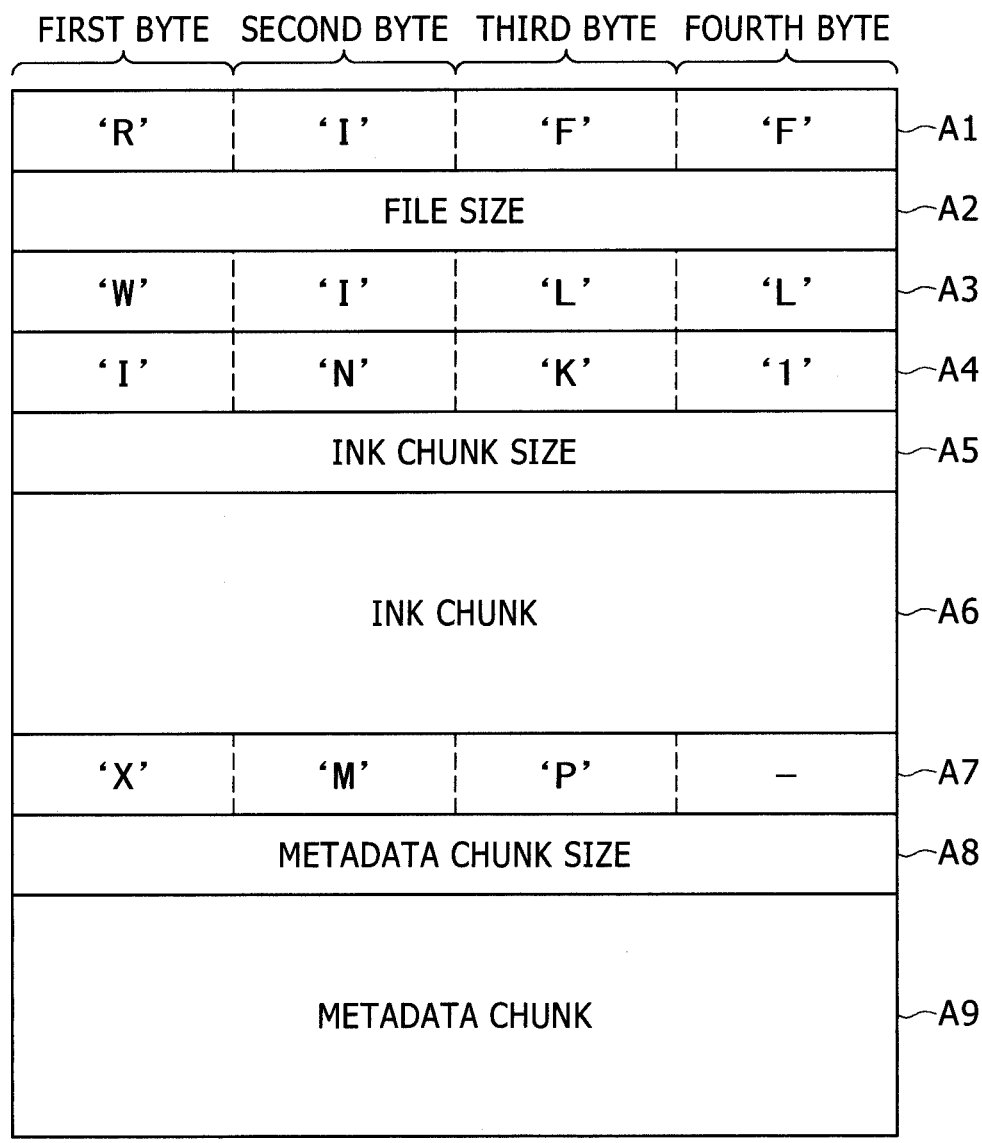
FIG. 14 is a diagram showing a structure of an ink file generated in RIFF.

The ink file generating section 37 is a functional unit that generates an ink file 40 on the basis of the stroke data SD and the logical name LN retained in the ink data retaining section 34. As shown in FIG. 14 to be described later, the ink file 40 generated by the ink file generating section 37 includes an ink chunk including the stroke data SD and a metadata chunk including the logical name LN as metadata.

The stroke data SD is stored in the ink chunk in a state of being encoded by a stroke data encoding section 35 corresponding to one format selected by the application 100 from among the stroke data encoding sections 35-1 to 35-*n* corresponding to formats (data structures and encoding systems) different from each other. Examples of the stroke data formats, to which the stroke data encoding sections 35-1 to 35-*n* correspond, include the formats described in Non-Patent Documents 1 to 4, such as InkML, ISF, and the like, a format according to the present invention be described with reference to FIG. 15 and FIG. 16, and the like.

The application 100 selects a stroke data encoding section 35 by supplying a stroke data format S_Fmt, which is information specifying the data format of strokes, to the ink file generating section 37. Details of the stroke data format S_Fmt will be described later with reference to FIG. 15.

On the other hand, the logical name LN is stored in the metadata chunk as a part of a metadata block including a description for associating one or more pieces of stroke data SD with the logical name LN. The metadata block is described in an XML format. More specifically, the metadata block is described in an XMP (Extensible Metadata Platform) format. The described metadata block is encoded (binarized) by the metadata encoding section 36 using an encoding system such as UTF-8 or the like, and stored within the metadata chunk.

Figure 3:
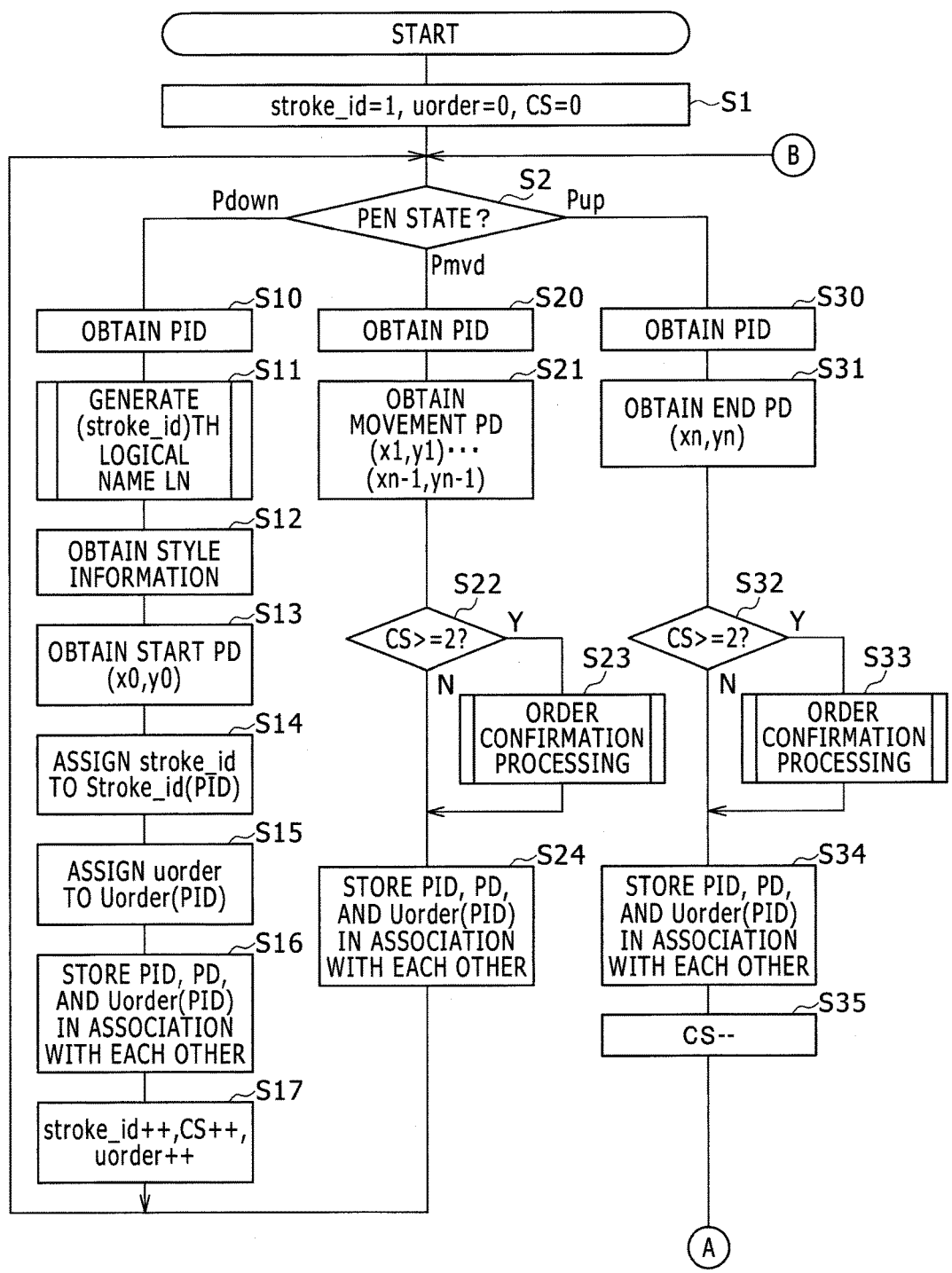
FIG. 3 is a processing flowchart showing a main routine (first half part) of processing of generating an ink file 40.
Figure 4:
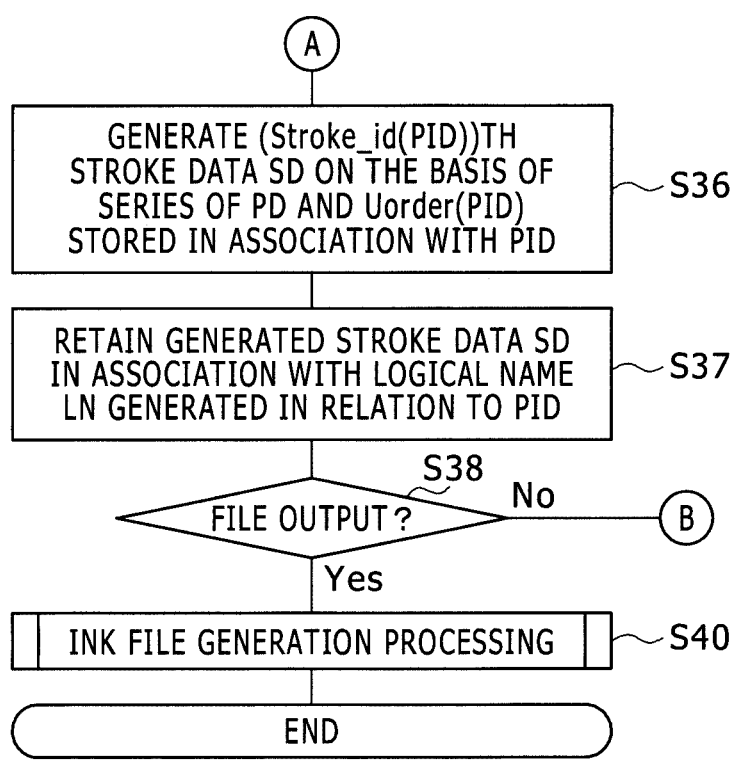
FIG. 4 is a processing flowchart showing the main routine (second half part) of the processing of generating the ink file 40.

FIG. 3 and FIG. 4 are processing flowcharts showing a main routine of processing of generating an ink file 40. The processing performed by the digital ink generating device 30 will be described again in the following in more detail with reference to these drawings.

In this processing as shown in FIG. 3, first, a numerical value "1" is set as a variable stroke_id, and a numerical value "0" is set as a variable "uorder" and a variable "CS" (step S1). The variable stroke_id is identification information (stroke identifier) given to uniquely identify a stroke without being distinguished by pen identification information PID. The variable uorder is a variable (order information) used to store the order in which strokes or partial segments of strokes are generated. The variable CS is numerical data indicating the number of electronic pens P detected simultaneously by the position detector 20 while a certain stroke is input.

Next, the input processing section 31 detects the state of an electronic pen P (step S2). When detecting that the electronic pen P is in the pen-down state Pdown in step S2, the input processing section 31 obtains the pen identification information PID from the position detector 20 (step S10), and supplies the pen identification information PID to the metadata generating section 33. The metadata generating section 33 generates a (stroke_id)th logical name LN on the basis of the supplied pen identification information PID (step S11). The processing of generating the logical name LN will be described later in more detail with reference to FIGS. 5 to 8.

Next, the input processing section 31 obtains style information such as a line width or the like on the basis of input information from the position detector 20, wherein the input information includes information indicating a pen pressure (step S12), and obtains point data PD from the position detector 20 (step S13). The point data PD obtained in step S13 is start coordinates (x0, y0) indicating a start point of one stroke. Incidentally, the order of obtainment of the various kinds of information in step S10, S12, and S13 is not limited to that described above.

Next, the input processing section 31 sets the value of the variable stroke_id at a given point in time as a stroke identifier Stroke_id(PID) (step S14). As with the variable stroke_id, the stroke identifier Stroke_id(PID) is information for identifying each stroke. However, for making distinction by pen identification information PID, the stroke identifier Stroke_id(PID) is retained in the form of an associative array having the pen identification information PID as an index (or key). This associative array is used to temporarily store the variable stroke_id to be given to the stroke data SD to be hereafter generated by the electronic pen P indicated by the pen identification information PID obtained in step S10. The various kinds of variables (stroke_id, uorder, and the like) are thus retained separately in the form of an associative array in addition to the normal variables in order to make it possible to distinguish and extract, by index (or key), the values of stroke_id and uorder given to each of a plurality of strokes in a process of being input while stroke data is input simultaneously by a plurality of different electronic pens P.

In addition, the input processing section 31 assigns the value of the variable uorder at a given point in time to order information Uorder(PID) (step S15). The order information Uorder(PID) is also an associative array having the pen identification information PID as an index. The order information Uorder(PID) is information indicating relative detection order (rendering order) between a plurality of pieces of point data PD (or between segments of point data PD) detected for a plurality of electronic pens P, respectively. The order information Uorder(PID) is stored in association with the detected point data PD (steps S16, S24, and S34 to be described later). The value of the order information Uorder (PID) may be updated by order confirmation processing performed in steps S23 and S33 to be described later. Details of the order confirmation processing will be described later with reference to FIGS. 9 to 11.

Next, the digital ink generating device 30 stores the pen identification information PID obtained in step S10, the point data PD obtained in step S13, and the latest order information Uorder(PID) in association with each other (step S16). Thereafter, the variable stroke_id, the variable CS, and the variable uorder are each incremented by 1 (step S17). The processing is then returned to step S2.

Next, after detecting that the electronic pen P is in the pen-moved state Pmvd in step S2, the input processing section 31 first obtains the pen identification information PID and point data PD from the position detector 20 (steps S20 and S21). The point data PD obtained in step S21 is movement coordinates (x1, y1) to (xn−1, yn−1) indicating intermediate points of one stroke. Incidentally, the order of obtainment of the various kinds of information in steps S20 and S21 is not limited to that described above, either.

Next, the input processing section 31 determines whether or not the variable CS is 2 or more (step S22). When the variable CS is 2 or more, the input processing section 31 performs order confirmation processing (step S23). The input processing section 31 next stores the pen identification information PID obtained in step S20, the point data PD obtained in step S21, and the latest order information Uorder(PID) in association with each other (step S24). Thereafter, the processing is returned to step S2.

Next, after detecting that the electronic pen P is in the pen-up state Pup in step S2, the input processing section 31 first obtains the pen identification information PID and point data PD from the position detector 20 (steps S30 and S31). The point data PD obtained in step S31 is end coordinates (xn, yn) indicating an end point of one stroke. Incidentally, the order of obtainment of the various kinds of information in steps S30 and S31 is not limited to that described above, either.

Next, the input processing section 31 determines whether or not the variable CS is 2 or more (step S32) in order to determine whether or not there is a stroke being input simultaneously. When the variable CS is 2 or more, the input processing section 31 performs order confirmation processing similar to that of step S23 (step S33). The input processing section 31 next stores the pen identification information PID obtained in step S30, the point data PD obtained in step S31, and the latest order information Uorder(PID) in association with each other (step S34). The value of the variable CS is then decremented by 1 (step S35).

Next, the stroke data generating section 32 generates (stroke_id(PID))th stroke data SD on the basis of the series of pieces of point data PD and the order information Uorder(PID) stored in association with the pen identification information PID obtained in step S30 (step S36). Incidentally, the value of the stroke identifier stroke_id(PID) is set in step S14. The stroke data SD generated here includes the series of pieces of point data PD and the order information Uorder(PID) as well as information indicating the (stroke_id (PID))th stroke data SD and the style information obtained in step S12. The stroke data SD generated in step S36 is retained in the ink data retaining section 34 in association with the logical name LN generated in step S11 in relation to the pen identification information PID obtained in step S30 (step S37).

The above processing is performed repeatedly (negative determination in step S38) until the above-described stroke data format S_Fmt is supplied from the application 100. When the stroke data format S_Fmt is supplied from the application 100, the ink file generating section 37 determines that an instruction to output an ink file 40 is given (positive determination in step S38), and performs ink file generation processing shown in step S40. An ink file 40 including a series of pieces of stroke data SD generated thus far is thereby generated. Details of the ink file generation processing will be described later in detail with reference to FIGS. 13 to 19.

The digital ink generating device 30 generates the ink file 40 as described above. Each piece of processing mentioned as to be described later will be described in order in the following.

The processing of generating the logical name LN will first be described with reference to FIGS. 5 to 8.

Figure 5:
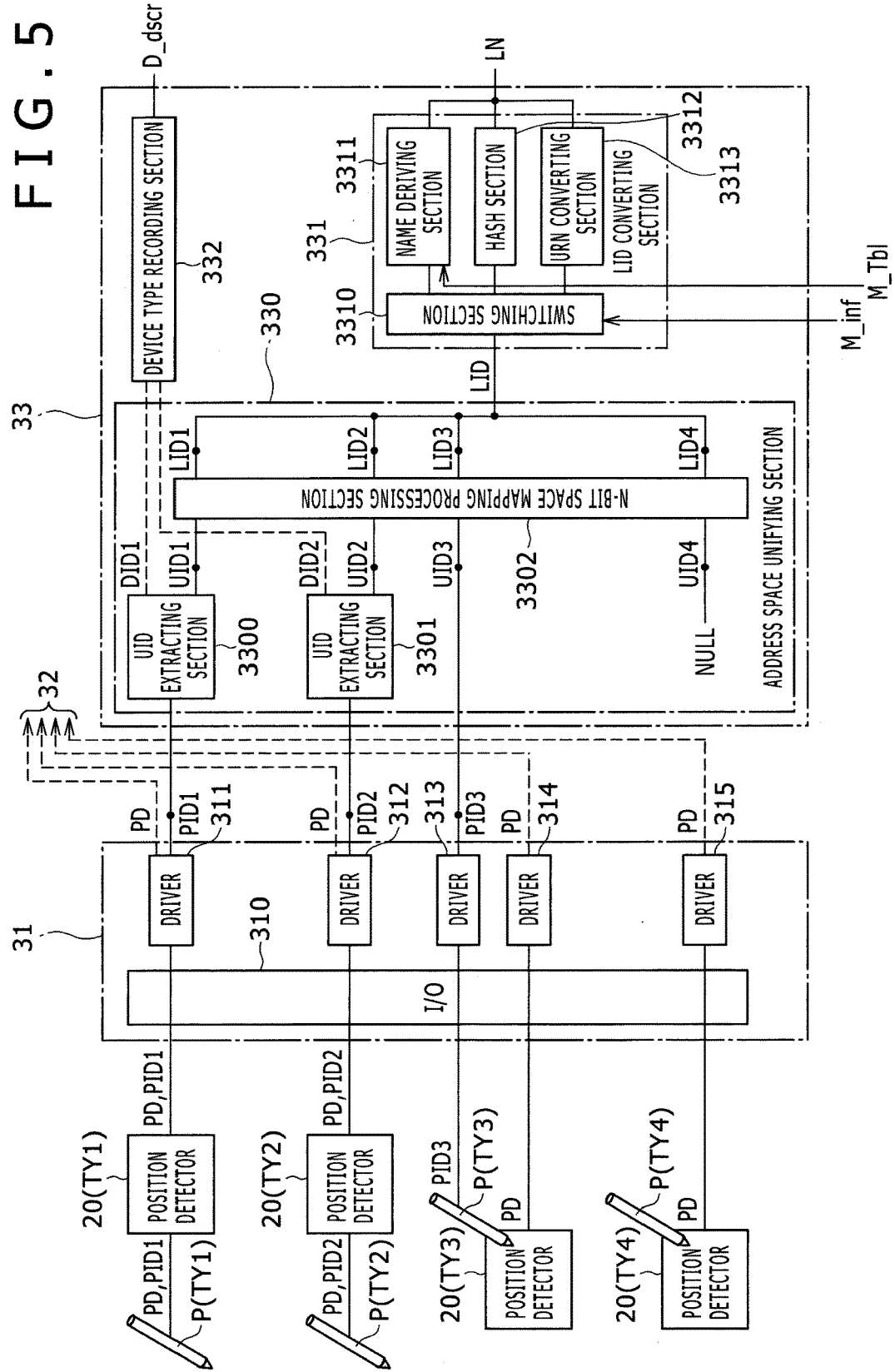
FIG. 5 is a diagram showing an internal configuration of an input processing section 31 and a metadata generating section 33 shown in FIG. 2.
Figure 6:
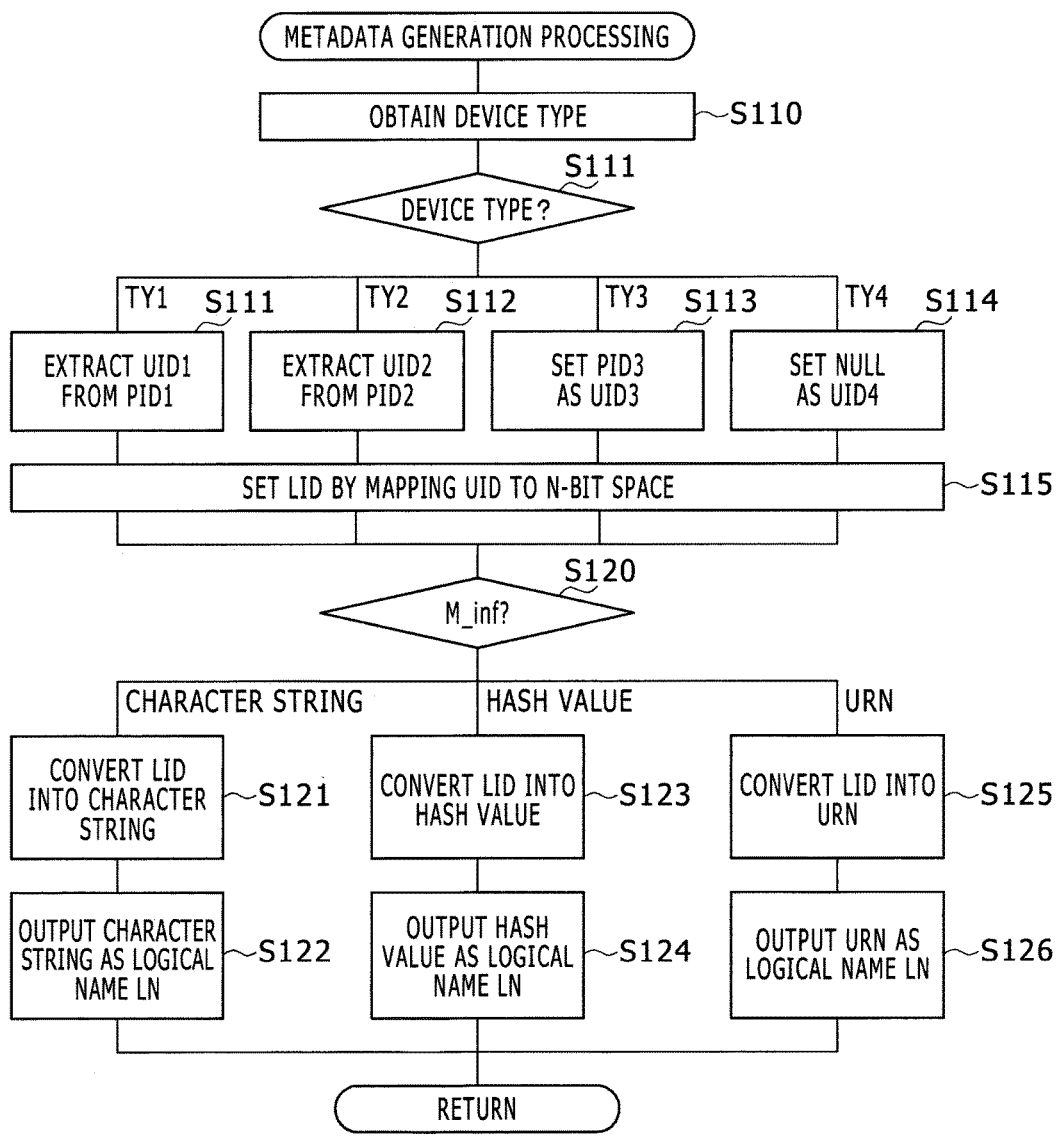
FIG. 6 is a processing flowchart of metadata generation processing shown in step S11 in FIG. 4.

FIG. 5 is a diagram showing an internal configuration of the input processing section 31 and the metadata generating section 33 shown in FIG. 2. The figure also shows four types TY1 to TY4 of the electronic pen P and the position detector 20. There are thus different types (device types) of electronic pens P and position detectors 20. In the case of any of the types, the point data PD of the electronic pen P is detected by the position detector 20, and supplied to the input processing section 31.

On the other hand, the various kinds of information transmitted by the electronic pen P, such as the pen identification information PID and the like, in the cases of the types TY1 and TY2 are once received by the position detector 20, and supplied to the input processing section 31. In the case of the type TY3, the various kinds of information transmitted by the electronic pen P are directly transmitted from the electronic pen P to the input processing section 31. Electronic pens Ps of the type TY3 include pens such as an electronic pen described in Patent Document 2, listed above. The point data PD of the electronic pen P is detected by the position detector 20 as a capacitance type touch panel, and supplied by an internal interface, whereas data such as a pen pressure and the like, which is not the point data PD, is supplied to the input processing section 31 through another communication channel using Bluetooth (registered trademark) or the like.

The electronic pen P of the type TY4 is typically an input device such as a touch pen used on a capacitance type touch panel. The electronic pen P of the type TY4 may be a device such as a mouse device for performing position input. The electronic pen P of the type TY4 does not store pen identification information PID. Hence, when the electronic pen P of this type is used, pen identification information PID is not supplied to the input processing section 31. In the following, (TYn) added to an end of the reference numeral of the electronic pen P or the position detector 20 indicates that the electronic pen P or the position detector 20 is of a type TYn (n is an integer of 1 to 4). In addition, the pen identification information PID of the types TY1 to TY3 will be written as pen identification information PID1 to PID3, respectively.

The input processing section 31 includes an input-output interface (I/O) 310 and drivers 311 to 315. The input-output interface 310 is a communication circuit configured according to a communication standard such as USB, $I^2C$, Bluetooth (registered trademark), or the like. The input processing section 31 plays a role of realizing communication performed between the position detector 20 of each type and the electronic pen P (TY3) of the type TY3.

The driver 311 is software (device driver) for controlling and operating the position detector 20 (TY1). The driver 311 has a function of receiving various kinds of information including point data PD and the pen identification information PID1 from the position detector 20 (TY1), and outputting the point data PD to the stroke data generating section 32 and outputting the pen identification information PID1 to the metadata generating section 33.

Figure 7:
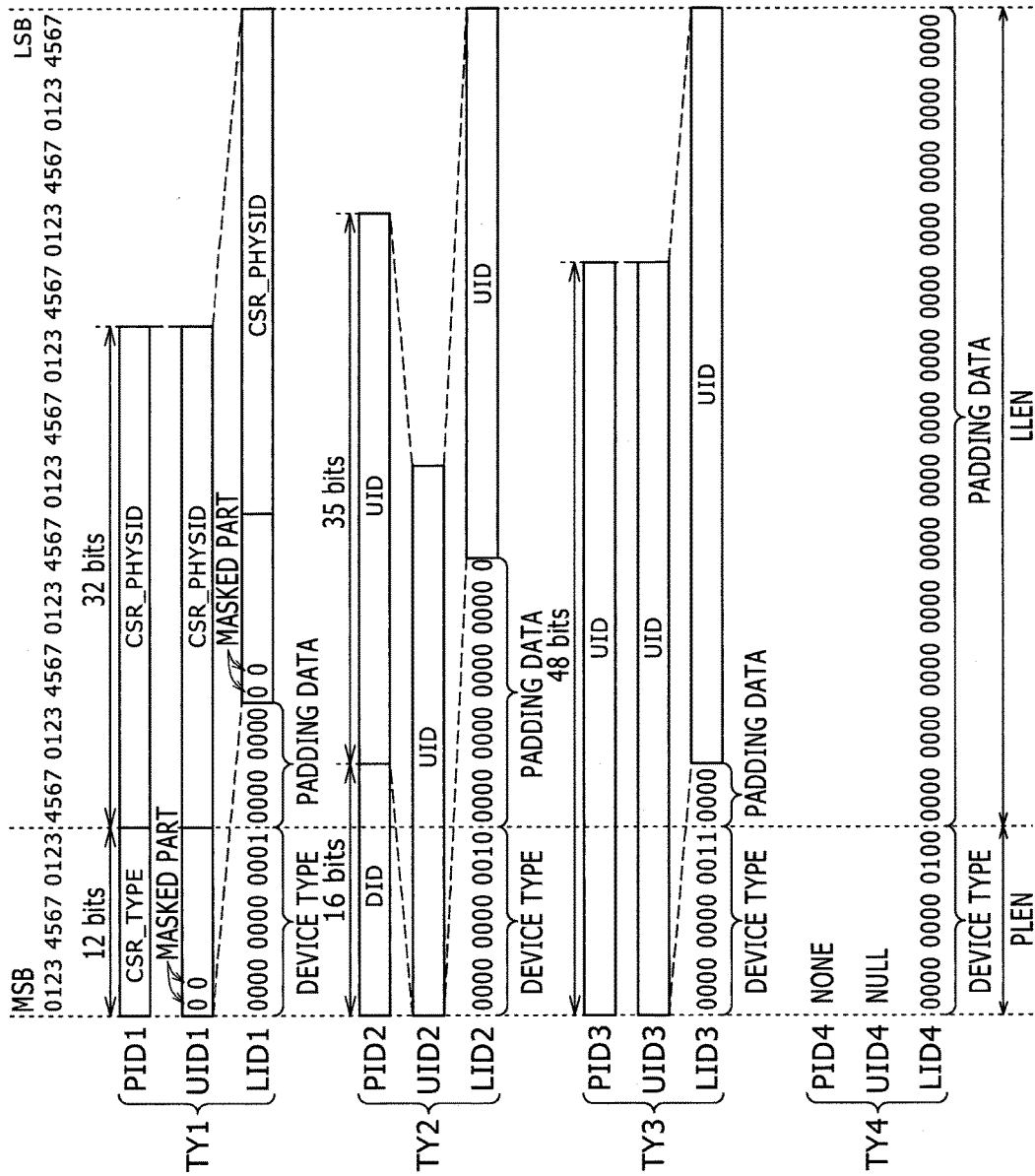
FIG. 7 is a diagram of assistance in explaining processing of generating logical identification information LID from pen identification information PID.

The pen identification information PID1 as first pen identification information PID is information according to the example of UniqueID described in Non-Patent Document 5. The pen identification information PID1 uses an ID space of K bits. The pen identification information PID1 is described in a format (first format) in which K1 bits of unique information UID including number information different for each electronic pen P and K2 bits as pen point identification bits are mixed in the K bits. More specifically, as shown in FIG. 7, the pen identification information PID1 is constituted of K bits (44 bits) including 12 bits of attribute information CSR_TYPE indicating various kinds of attributes of the electronic pen P (TY1), including an attribute indicating the type TY1, and 32 bits of serial number information CSR_PHYSID indicating the serial number of the electronic pen P (TY1). The attributes indicated by the attribute information CSR_TYPE include, for example, a kind of pen point (pen, airbrush, or the like) of the electronic pen P (TY1), information for distinguishing a plurality of pen points of the electronic pen P (TY1) from each other, and the like. The latter attribute is necessary when the electronic pen P (TY1) has pen points at both ends, for example, and is indicated by one or more bits (K2 bits, or two bits in the example) (hereinafter referred to as "pen point identification bits") within the attribute information CSR_TYPE. The pen point identification bits enable the input processing section 31 to distinguish whether the input of the point data PD being input now is performed on a pen tip side of a certain stylus or on a pen tail side of the same stylus (the pen tail side is typically associated with a function of an eraser or the like). Unlike unique information UID within the pen identification information PID2 to be described later or the like, the serial number information CSR_PHYSID is not information different for each electronic pen P by itself. The serial number information CSR_PHYSID becomes information different for each electronic pen P by being combined with a part of the attribute information CSR_TYPE (the part excluding the pen point identification bits).

The driver 312 is software (device driver) for controlling and operating the position detector 20 (TY2). The driver 312 has a function of receiving various kinds of information including point data PD and the pen identification information PID2 from the position detector 20 (TY2), and outputting the point data PD to the stroke data generating section 32 and outputting the pen identification information PID2 to the metadata generating section 33.

The pen identification information PID2 as second pen identification information PID uses an ID space of L bits. The pen identification information PID2 is described in a format (second format) in which L2 bits (16 bits) of device information DID and L1 bits (35 bits) of unique information UID provided to uniquely identify the casing of each electronic pen are simply coupled to each other. Specifically, as shown in FIG. 7, the pen identification information PID2 is constituted of 16 bits of device information DID indicating various kinds of attributes of the electronic pen P (TY2), including an attribute indicating the type TY2, and 35 bits of unique information UID including number information different for each electronic pen P. The attributes indicated by the device information DID are basically similar to those of the above-described attribute information CSR_TYPE. However, the attributes indicated by the device information DID may not include the above-described pen point identification bits.

The driver 313 is software for controlling and operating the electronic pen (TY3). The driver 313 has a function of receiving various kinds of information including the pen identification information PID3 from the electronic pen (TY3) and outputting the various kinds of information to the metadata generating section 33.

The pen identification information PID3 as third pen identification information PID uses an ID space of M bits. The pen identification information PID3 is described in a format (third format) in which the casing of each electronic pen is identified by the entire M bits. Specifically, as shown in FIG. 7, the pen identification information PID3 is constituted of 48 bits of unique information UID including number information different for each electronic pen P. As a system for giving an ID, for example, a Bluetooth address of 48 bits or an address including a vendor ID such as an IEEE EUI-48 or the like is used. Information corresponding to the device information DID of the pen identification information PID2 is not included in the pen identification information PID3.

The driver 314 is software (device driver) for controlling and operating the position detector 20 (TY3). The driver 314 has a function of receiving various kinds of information including point data PD from the position detector 20 (TY3) and outputting the received point data PD to the stroke data generating section 32.

The driver 315 is software (sensor driver) for controlling and operating the position detector 20 (TY4). The driver 315 has a function of receiving various kinds of information including point data PD from the position detector 20 (TY4) and outputting the received point data PD to the stroke data generating section 32.

The metadata generating section 33 includes an address space unifying section 330, an LID converting section 331, and a device type recording section 332. Of the constituent elements, the address space unifying section 330 includes, as an internal configuration thereof, UID extracting sections 3300 and 3301 and an N-bit space mapping processing section 3302. In addition, the LID converting section 331 includes, as an internal configuration thereof, a switching section 3310, a name deriving section 3311, a hash section 3312, and a URN converting section 3313. Functions of these sections will be described in the following while the processing of the metadata generating section 33 is described in a processing flowchart of FIG. 6.

First, the metadata generating section 33 obtains the device type (above-described type TY1 to TY4) of the electronic pen P and the position detector 20 coupled to the digital ink generating device 30 (step S110). Then, processing corresponding to the format of the pen identification information PID, which is identified according to the obtained device type, is performed (each of various options branching out from step S111). The following description will be made for each type.

First, when the device type is the type TY1, the format of the pen identification information PID is identified as the first format. The first format is a format in which unique information UID including number information different for each electronic pen P and pen point identification bits are mixed in K bits. Thus, the UID extracting section 3300 extracts the unique information UID including number information different for each electronic pen P from the pen identification information PID1 supplied through the corresponding driver 311 (step S111). Specifically, as shown in FIG. 7, this extraction is performed by masking, with "0" bits, the part corresponding to the above-described pen point identification bits in the attribute information CSR_TYPE. As shown in FIG. 5, the UID extracting section 3300 supplies the N-bit space mapping processing section 3302 with the extracted unique information UID as unique information UID1 corresponding to the type TY1. In addition, the UID extracting section 3300 supplies the device type recording section 332 with the contents of the masked pen point identification bits as device information DID1.

Next, when the device type is the type TY2, the format of the pen identification information PID2 obtained by the driver is the second format. In the second format, L1 bits of device information DID and L2 bits of unique information UID provided to uniquely identify the casing of each electronic pen are coupled to each other. Hence, the UID extracting section 3301 extracts the unique information UID including number information different for each electronic pen P from the pen identification information PID2 supplied through the corresponding driver 312 (step S111). As shown in FIG. 7, this extraction is the processing of simply extracting the unique information UID within the pen identification information PID2. As shown in FIG. 5, the UID extracting section 3301 supplies the N-bit space mapping processing section 3302 with the extracted unique information UID as unique information UID2 corresponding to the type TY2. In addition, the UID extracting section 3301 supplies the device type recording section 332 with the device information DID included in the pen identification information PID2 as device information DID2.

Next, when the device type is the type TY3, the obtained pen identification information PID is in the third format. The third format uses an ID space of M bits, and is described as a format in which the casing of each electronic pen is identified by the entire M bits. Hence, the entirety of the pen identification information PID3 is supplied as unique information UID3 corresponding to the type TY3 to the N-bit space mapping processing section 3302 (step S112).

Finally, when the device type is the type TY4, there is no pen identifier obtained. When there is no pen identifier obtained, the N-bit space mapping processing section 3302 sets NULL (predetermined dummy data) as unique information UID4 corresponding to the type TY4 (step S113). This is a measure to also treat the electronic pen P (TY4) of the type TY4 not storing the pen identification information PID in a similar manner to electronic pens P of the other types. The unique information UID4 does not have a function of uniquely identifying the electronic pen P.

After the unique information UID is obtained in steps S111 to S114, the N-bit space mapping processing section 3302 maps the unique information UID to an N-bit space (step S115). As a result of this mapping processing, logical identification information LID is obtained. Detailed description will be made in the following with reference to FIG. 7.

The number of bits of the space to which mapping is performed is not particularly limited. However, the number of bits of the space to which mapping is performed is 64 in FIG. 7. The mapping processing includes a first step and a second step as follows.

First, in the first step, a number of bits LLEN (52 bits in the example) is determined, wherein the number of bits LLEN is equal to or more than a largest number of bits (48 bits) of the numbers of bits of the unique information UID, wherein the numbers are different according to the formats of pen identifiers (K1 (42) bits in the first format, L1 (35) bits in the second format, M (48) bits in the third format, and 0 bits for a device of the type TY4). It suffices to make this determination once beforehand. The unique information UID obtained in the various kinds of formats is unified into information of LLEN bits (52 bits) by adding padding data of "0" to the head of the unique information UID obtained by mask processing or separation processing so that the unique information UID is adjusted to the number of bits LLEN.

Next, in the second step, information of PLEN bits (12 bits in the example) for indicating a device type or a format type is added to the head of the unique information of LLEN bits. In the example of FIG. 7, "1" for the type TY1, "2" for the type TY1, "3" for the type TY3, and "4" for the type TY4 are set in 12 bits to the information indicating the four kinds of device types. Incidentally, two bits suffice to distinguish four pieces of information from each other. However, 12 bits are used to adjust the number of ID space bits to a power of 2, such as 64 bits, 128 bits, or the like.

Information of N bit (64 bits) as LLEN bits (52 bits)+ PLEN bits (12 bits), which is ultimately obtained by the mapping processing including the two steps, constitutes logical identification information LID. The pieces of logical identification information LID obtained for the respective types TY1 to TY4 are supplied as logical identification information LID1 to LID4, respectively, from the N-bit space mapping processing section 3302 to the switching section 3310 within the LID converting section 331.

The switching section 3310 selects one of the name deriving section 3311, the hash section 3312, and the URN converting section 3313 on the basis of metadata information M_inf supplied from the application 100 (see FIG. 2) (step S120). This selection is determined in advance according to the preferences of the user or the developer of the application 100 in relation to the disclosure of the pen identification information. The switching section 3310 is configured to then output the supplied logical identification information LID to the selected functional section.

The name deriving section 3311 is a functional unit that converts the logical identification information LID into a character string and which outputs the obtained character string as a logical name LN (steps S121 and S122). The application 100 supplies the name deriving section 3311 with one table M_Tbl, which associates the logical identification information LID and the character string with each other. Even in an environment in which a plurality of formats are mixed with each other as formats of pen identifiers, it suffices to supply one table from the application 100, because the logical identification LID is mapped to the single space by the above-described mapping processing. The name deriving section 3311 receives the table M_Tbl in which sets of logical identification information LID and character strings are enumerated, and performs the above-described conversion by reading, from the table MTb1, the character string corresponding to the logical identification information LID supplied from the switching section 3310. Incidentally, even in a case where the conversion of the name deriving section 3311 is performed on the application 100 side, it suffices for the application 100 to similarly implement only a routine processing only the logical identification information LID described in the single format.

FIG. 8A is a diagram showing an example of the table M_Tb1 supplied to the name deriving section 3311. As shown in the figure, a user name can be used as the character string constituting the logical name LN in this case. It is possible to filter stroke data SD by the name of a person when reproducing the ink file 40 later. In addition, associating a same user name with a plurality of electronic pens P (logical identification information LID) makes it possible to collectively extract a plurality of pieces of stroke data SD drawn by one person using the plurality of electronic pens P by filtering using one filter condition. In addition, information different from the pen identification information can be output to meet the preferences of a user who hesitates to allow the pen identification information to be included in ink data and disclosed, or of a user who prefers a character string obtained by converting the pen identification information into a name as the pen identification information, as opposed to a row of numerical values as the pen identification information.

As shown in FIG. 8B, the hash section 3312 is a functional unit that converts the logical identification information LID into a hash value by a predetermined one-way function, and which outputs the obtained hash value as a logical name LN (steps S123 and S124). In this case, a filter condition based on the hash value is specified in order to filter stroke data SD when reproducing the ink file 40. This prevents the logical identification information LID from being seen by the eyes of the user, and can therefore conceal the logical identification information LID from the user. Incidentally, it is desirable to use, as the one-way function to be used by the hash section 3312, a one-way function designed to be able to practically reduce to zero a possibility of a plurality of pieces of logical identification information LID corresponding to one hash value (that is, a possibility of a so-called collision occurring).

As is also shown in FIG. 8C, the URN converting section 3313 is a functional unit that converts the logical identification information LID into a URN (Uniform Resource Name) by adding a predetermined header, and which outputs the obtained URN as a logical name LN (steps S125 and S126). In the example of FIG. 8C, a header "urn:dev:wcm:" is added, wherein the header indicates that the electronic pen P conforms to the system of the logical identification information LID according to the present invention. This can limit a range of electronic pens P to be identified by logical identification information LID, and distinguish the ink data to which logical identification information LID according to the present invention is assigned from the ink data to which logical identification information according to another invention may be assigned.

The device type recording section 332 has a function of generating device information D_dscr on the basis of device information DID supplied from the address space unifying section 330, and outputting the device information D_dscr to the outside. This device information D_dscr can be treated as a part of the logical name LN in subsequent processing by being added to the logical name LN, for example. This enables the device information DID to be used as a part of filter information at a time of reproduction of the ink file 40, which will be described later.

The processing of generating the logical name LN has been described above. The order confirmation processing shown in step S23 in FIG. 3 will next be described with reference to FIGS. 9 to 11. Incidentally, the order confirmation processing performed in step S33 is similar processing.

<Order Confirmation Processing>

The order confirmation processing will be described in the following with reference to an example of FIG. 10. A before-and-after relation between two strokes is not a simple question of determining which of two graphic objects to set in a foreground and which of the two graphic objects to set in a background. A superposition relation between strokes needs to be determined at an intersection position indicated by a broken line frame IS1 in FIG. 10A, at which the two strokes intersect each other. In the example of FIG. 10, two kinds of electronic pens $P_A$ and $P_B$ are used simultaneously. As shown in FIG. 10B, the trajectory of the electronic pen $P_A$ is indicated by coordinates A1 to A4, and the trajectory of the electronic pen $P_B$ is indicated by coordinates B1 to B4. As shown in FIG. 10A, the trajectory of the electronic pen $P_A$ and the trajectory of the electronic pen $P_B$ intersect each other, and the trajectory of the electronic pen $P_A$ is disposed in a foremost plane at the point of the intersection. Such an arrangement occurs in a case where timing in which the electronic pen $P_A$ passes the point of intersection is at a later time than timing in which the electronic pen $P_B$ passes the point of intersection.

In the processing flow shown in FIG. 3, supposing that the two electronic pens $P_A$ and $P_B$ are both set in the pen-down state Pdown, the variable CS indicating the number of strokes started simultaneously becomes 2. Then, the determination result in step S22 is positive while the electronic pens $P_A$ and $P_B$ both maintain the pen-moved state Pmvd. The order confirmation processing in step S23 is therefore performed each time new point data PD is obtained in step S21 for each of the electronic pens $P_A$ and $P_B$.

Figure 9:
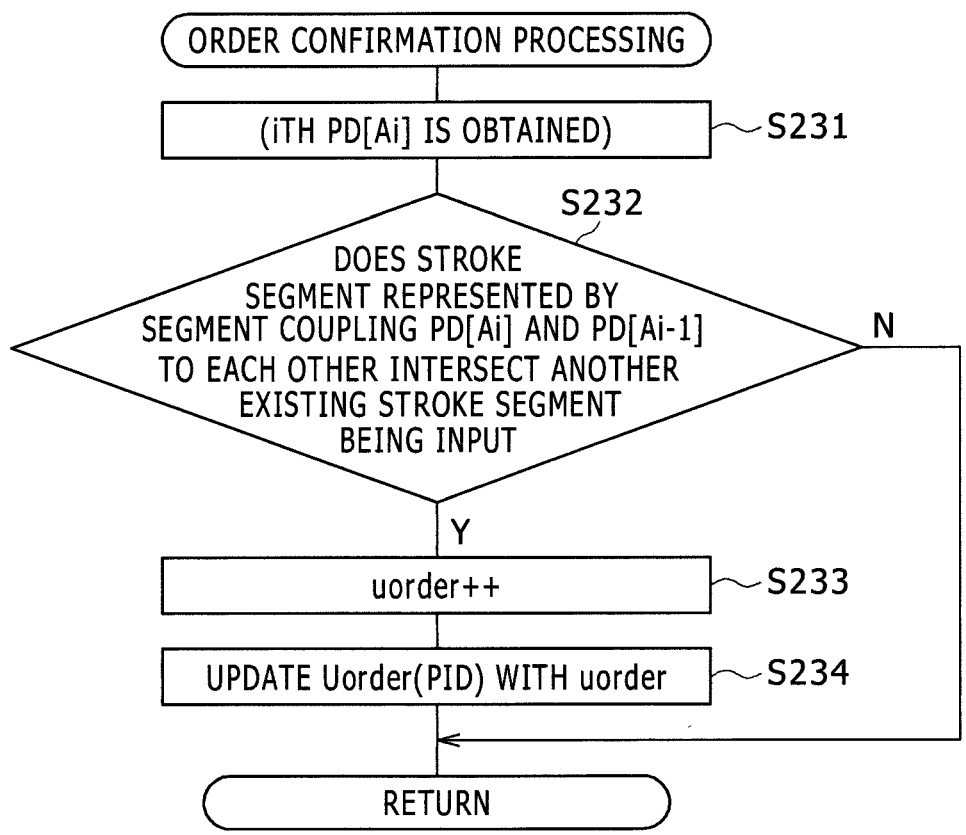
FIG. 9 is a processing flowchart of order confirmation processing shown in step S23 in FIG. 3.

FIG. 9 shows a case where an ith coordinate Ai of the electronic pen $P_A$ is obtained in step S21 in FIG. 3 (step S231). In this case, the input processing section 31 determines whether or not a stroke segment (a part of a stroke) indicated by a segment, which connects the newly obtained coordinate Ai to a coordinate Ai−1 obtained immediately previously in relation to the electronic pen $P_A$, intersects an already input stroke segment of another stroke that is being input simultaneously (step S232). This determination is not a determination of whether the present stroke intersects all of existing strokes; rather, the determination is limited with respect to the other stroke that is being input simultaneously. In the example of FIG. 10, the determination result is negative when i=2 and 4, whereas the determination result is positive when i=3 because a stroke segment represented by a segment that connects a coordinate B2 to a coordinate B3 is already present and the stroke segment represented by a segment that connects a coordinate A3 to a coordinate A2 (as drawn by the electronic pen $P_A$) intersects the preexisting stroke segment.

The order confirmation processing ends when a negative determination is obtained in step S232. When a positive determination is obtained in step S232, on the other hand, the variable uorder is incremented by 1 (step S233), and further the order information Uorder(PID) is updated based on the new variable uorder (step S234). The pen identification information PID in this case is the pen identification information PID of the electronic pen $P_A$.

FIG. 10C shows values of the order information Uorder (PID) associated with respective coordinates in step S24 in FIG. 3 as a result of the above order confirmation processing. As shown in the figure, the processing of step S15 in FIG. 3 associates order information Uorder(PID) of "0" with a coordinate A1, and associates order information Uorder (PID) of "1" with a coordinate B1. Thereafter, the variable uorder(PID) of "1" is associated with each of the coordinates B1 to B4 indicating the trajectory of the electronic pen $P_B$. On the other hand, order information Uorder(PID) of "2" is associated with the trajectory of the electronic pen $P_A$ at and after a point in time when the coordinate A3 is reached. Thus, the sequential order of the drawing from the coordinates A1 and A2, the coordinates B1 to B4, and to the coordinates A3 and A4 is stored as the integer values.

Incidentally, the sequential order of the drawing as stored need not reflect time order in which the input was performed. For example, the order confirmation processing according to the present embodiment does not detect which of the coordinate B4 and the coordinate A4 is drawn first.

However, it is also possible, for example, to store, in association with each coordinate, information indicating the time (an absolute time or a relative time from a start of drawing) when the electronic pen P reaches the coordinate. According to this method, it is possible to accurately store before-and-after relation between all of coordinates, and reproduce drawing processing on the screen as in the case of an animation. Incidentally, for the purpose of properly restoring the before-and-after relation of the stroke data SD using a smallest possible amount of data, it suffices to store the order information Uorder(PID) as described above. Which method of storing a before-and-after relation to use can be specified by the application 100.

The order confirmation processing will be described again with reference to another example shown in FIG. 11. This example represents a complex example in which two or more strokes are generated simultaneously and intersect each other a plurality of times while changing (switching) the before-and-after (over-and-under) relation at positions indicated by broken line frames IS2 and IS3 in FIG. 11A.

Electronic pens P used simultaneously in the present example are the two electronic pens $P_A$ and $P_B$ as in the example of FIG. 10. As shown in FIG. 11B), the trajectory of the electronic pen $P_A$ is indicated by coordinates A1 to A9, and the trajectory of the electronic pen $P_B$ is indicated by coordinates B1 to B5. As shown in FIG. 11A, the trajectory of the electronic pen $P_A$ and the trajectory of the electronic pen $P_B$ intersect each other at two positions. The first is an intersection realized by a stroke segment represented by a segment that connects the coordinate A2 to the coordinate A3 and a stroke segment represented by a segment that connects the coordinate B2 to the coordinate B3. The second is an intersection realized by a stroke segment represented by a segment that connects the coordinate A7 to the coordinate A8 and a stroke segment represented by a segment that connects the coordinate B4 to the coordinate B5. At the former, the trajectory of the electronic pen $P_A$ is disposed in a foremost plane. At the latter, the trajectory of the electronic pen $P_B$ is disposed in a foremost plane.

As in the example of FIG. 10, order information Uorder (PID) of "0" is associated with the coordinate A1, and order information Uorder(PID) of "1" is associated with the coordinate B1. Thereafter, the order information Uorder (PID) of "1" continues to be associated with coordinates up to the coordinate B4 for the electronic pen $P_B$. This is because, during the drawing from coordinates B1 through B4, the stroke segment of the electronic pen $P_B$ does not intersect another existing stroke segment.

On the other hand, order information Uorder(PID) of "2" is associated with the trajectory of the electronic pen $P_A$ at and after a point in time when the coordinate A3 is reached. This is because the stroke segment represented by the segment that connects the coordinate B2 to the coordinate B3 is present directly under the stroke segment represented by the segment that connects the coordinate A2 to the coordinate A3 at a point in time when the stroke segment represented by the segment that connects the coordinate A2 to the coordinate A3 is drawn. Thereafter, the order information Uorder(PID) of "2" is associated with each of the coordinates A3 to A9 that indicate the trajectory of the electronic pen $P_A$.

Order information Uorder(PID) of "3" is associated with the coordinate B5 of the electronic pen $P_B$. This is because the stroke segment represented by the segment that connects the coordinate A7 to the coordinate A8 is present directly under the stroke segment represented by the segment that connects the coordinate B4 to the coordinate B5 at a point in time when the stroke segment represented by the segment that connects the coordinate B4 to the coordinate B5 is drawn.

As a result of the above processing, as shown in FIG. 11C), the sequential order of the drawing from coordinates A1 and A2, the coordinates B1 to B4, the coordinates A3 to A9, and to the coordinate B5 is stored.

The before-and-after relation stored as described above is simplified to represent a superposition relation, in the segment unit, only when the superposition relation actually occurs that requires determination of which coordinate to display in an uppermost layer and which coordinate to display in a lowermost layer. In most other cases, the output Uorder(PID) is provided in the stroke unit. Order information is added only in rare cases where two strokes occur simultaneously and segments thereof intersect each other. In addition, the value is incremented only when intersection occurs, such that an amount of data can be reduced by performing differential coding as in the encoding of the point data PD.

FIG. 12A is a diagram illustrating a series of pieces of information stored within one ink file including the stroke data shown in FIG. 11. In addition, FIG. 12B shows a series of pieces of information obtained by sorting the series of pieces of information shown in FIG. 12A according to the order information Uorder(PID).

As shown in FIG. 12B, for each piece of order information Uorder(PID), a stroke identifier Stroke_id(PID), an order information storage unit, a series of pieces of point data PD, and a logical name LN (information for identifying an input device) are stored in association with each other within one ink file. Incidentally, as will be described later in detail, of these pieces of information, the association of the logical name LN with the stroke identifier Stroke_id(PID) is stored within a metadata block, and the other information is stored as stroke data within the ink file. In addition, a part enclosed by a thick black frame in FIGS. 12A and 12B is a part corresponding to the stroke data shown in FIG. 11. Here, the numbers "0" to "3," which are used as Uorder (PID) in FIG. 11C, are converted into "100" to "103," respectively, to indicate that there are other pieces of preceding and succeeding stroke data in FIG. 12.

A record having "stroke" as the unit for storing the order information in FIG. 12 indicates stroke data whose order information Uorder(PID) is not changed while one stroke is drawn by the user. On the other hand, a record having "stroke segment" as the unit for storing the order information indicates stroke data whose order information Uorder (PID) is changed while one stroke is drawn by the user. In the latter case, as shown in FIG. 12, a series of pieces of point data PD before the order information Uorder(PID) is changed and a series of pieces of point data PD after the order information Uorder(PID) is changed are stored as separate records within the ink file.

The order confirmation processing has been described above. The ink file generation processing shown in step S40 in FIG. 4 will next be described with reference to FIGS. 13 to 19.

<Ink File Generation Processing>

Figure 13:
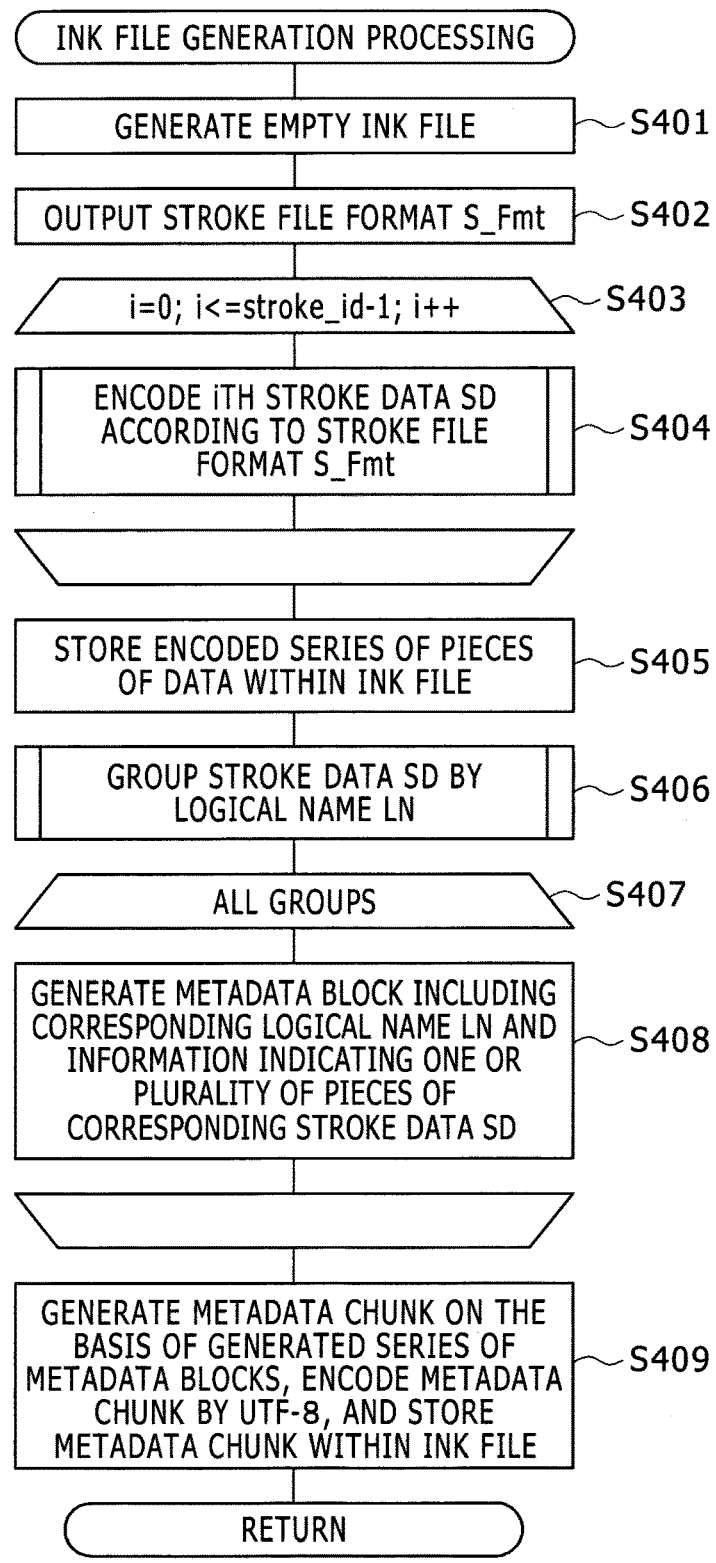
FIG. 13 is a processing flowchart of ink file generation processing shown in step S40 in FIG. 4.

FIG. 13 is a processing flowchart of the ink file generation processing performed by the ink file generating section 37 shown in FIG. 2. In the present invention, the ink file 40 is generated in a general-purpose metafile format, such as RIFF (Resource Interchange File Format) or the like. In addition, in the following example, stroke data SD is encoded by a first encoding system that applies differential encoding to point data PD, and the above-described metadata block is encoded by a character string (character) encoding system specified by an XML, format included in a metadata chunk, such as UTF-8 or the like.

As shown in FIG. 13, the ink file generating section 37 first generates an empty ink file 40 (step S401).

FIG. 14 shows a structure of the ink file 40 generated in RIFF. As shown in the figure, the ink file 40 in RIFF has a structure in which regions A1 to A9, each having a size as an integer multiple of four bytes, are arranged in order from a start to an end of the ink file.

Concrete contents of data stored in the regions A1 to A9 are as follows. First, in the region A1, four characters "R," "I," "F," and "F" indicating that the ink file 40 is generated in RIFF are arranged. In addition, in the region A2, a numerical value indicating the size of the ink file 40 is arranged. The regions A1 and A2 each have a size of four bytes. The file size indicated within the region A2 is used by a device that reproduces the ink file 40 (for example the digital ink reproducing device 50 shown in FIG. 1) to determine an end position of the ink file 40.

In the region A3, four characters (for example "W," "I," "L," and "L") are arranged, wherein the four characters indicate that the entire ink data stored in the regions A4 to A9 is described by an ink data output method according to the present invention ("WILL" is a trademark of the ink data and the ink data input/output/communication methods, systems and programs according to various embodiments of the present invention). The region A3 also has a size of four bytes. When the data within the regions A4 to A9 is described in another form such as InkML or the like, the contents stored in the region A3 are different from the above, of course.

In the region A4, four characters of a character string (for example "I," "N," "K," and "1") are arranged, wherein the character string indicates that the data stored in the regions A5 and A6 is related to an ink chunk generated in a stroke data format to be described with reference to FIG. 15 and FIG. 16. The region A4 also has a size of four bytes.

In the region A5, an ink chunk size, which is data indicating the size of the region A6, is stored. The region A5 also has a size of four bytes. This ink chunk size is used by the device that reproduces the ink file 40 (for example the digital ink reproducing device 50 shown in FIG. 1) to determine an end position of the region A6.

In the region A6, an ink chunk including one or more pieces of stroke data SD is stored. The size of the region A9 is an integer multiple of four bytes. When an amount of data of the ink chunk is not exactly an integer multiple of four bytes, predetermined padding data is inserted at an end. Concrete contents stored in the region A6 will be described later in detail with reference to FIGS. 15 to 17.

In the region A7, four characters "X," "M," "P," and "-" are arranged, wherein the four characters indicate that data stored in the regions A8 and A9 is described in an XMP format, out of XML formats. The region A7 also has a size of four bytes. "-" is padding data for adjusting the size of the region A7 to four bytes.

The region A8 stores a metadata chunk size, which is data indicating the size of the region A9. The region A8 also has a size of four bytes. This metadata chunk size is used by the device that reproduces the ink file 40 (for example the digital ink reproducing device 50 shown in FIG. 1) to determine an end position of the region A9.

The region A9 stores a metadata chunk including the above-described metadata block. The size of the region A9 is an integer multiple of four bytes. When an amount of data of the metadata chunk is not exactly an integer multiple of four bytes, predetermined padding data is inserted at an end. Concrete contents stored in the region A9 will be described later in detail with reference to FIG. 18 and FIG. 19.

The description returns to FIG. 13. After generating the empty ink file 40 in step S401, the ink file generating section 37 includes the four characters "W," "I," "L," and "L" indicating that the ink data output method according to the present invention is performed, and includes, by ASCII code, the four characters "I," "N," "K," and "1" for identifying the type of the supplied stroke data format S_Fmt as shown in FIG. 2 (step S402).

Figures 15A, 15B, 15C:
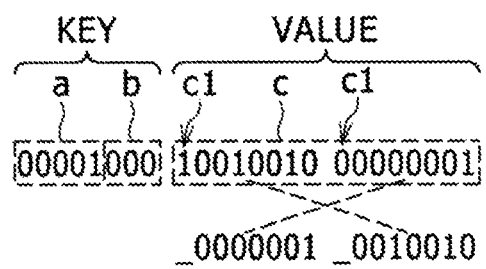
FIG. 15A is a diagram showing a stroke data format for defining the format of WILL-format stroke data.
FIG. 15B is a diagram showing a concrete form of representation of each attribute shown in FIG. 15A.
FIG. 15C is a diagram showing a concrete form of representation of a stroke attribute having a hierarchical structure.
Figure 16:
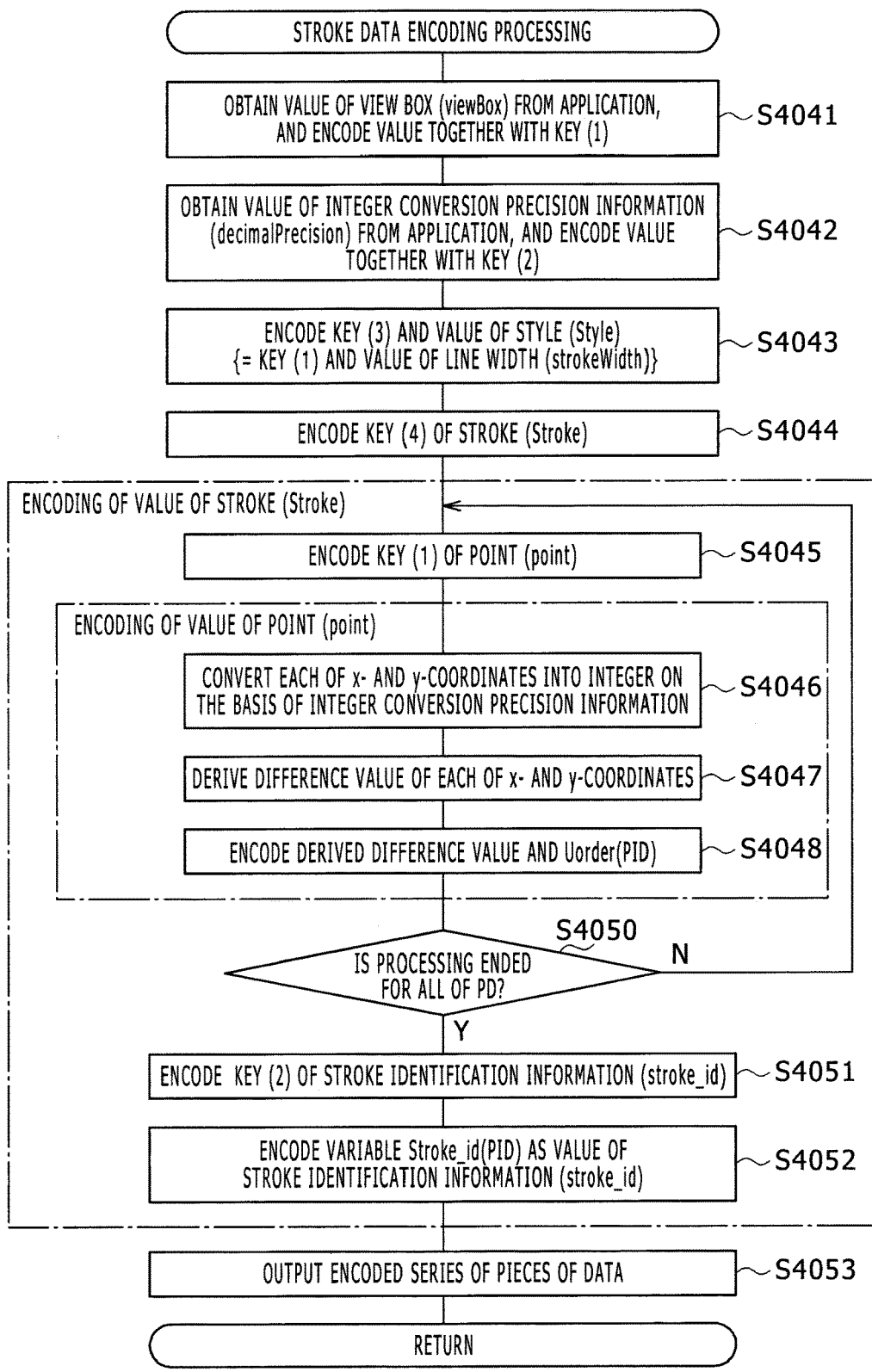
FIG. 16 is a processing flowchart of stroke data encoding processing shown in step S404 in FIG. 13.

FIG. 15A is a diagram showing an example of a first format (encoding method) identified by "I," "N," "K," and "1" as the value of the stroke data format S_Fmt. The stroke data format S_Fmt according to the present example includes three message objects of a document (Document), a style (Style), and a stroke (Stroke). The message object as the document represents one ink chunk, and includes the attributes of a view box (viewBox), an integer conversion precision information (decimalPrecision), a style (Styles), and a stroke (Strokes), as well as numbers ("1" to "4") representing the keys of the respective attributes. The message object as the style indicates concrete contents of the style attribute within the message object as the document, and in this case includes a line width (strokeWidth) attribute and a number indicating the key of the attribute. The message object as the stroke indicates concrete contents of the stroke attribute within the message object as the document, and includes the attributes of a point (point) corresponding to point data PD and stroke identification information (stroke_id) for uniquely identifying a stroke, as well as numbers indicating the keys of the respective attributes. Incidentally, attributes to which "repeated" is added indicate that a plurality of same attributes may be included.

FIG. 15B is a diagram showing a concrete form of representation of each attribute. As shown in the figure, each attribute is represented by a bit string of 8 bits, which represents a "key," and a bit string of a variable length (where the variable length is an integer multiple of 8 bits), which represents a "value." The bit string representing the key is constituted of a bit string a of 5 bits representing the key ("1" in the present example) and a bit string b of 3 bits indicating a data type. The bit string indicating the value is represented by a variable-length number of bytes necessary to express the value. In the case of the integer type, an encoding method is used which requires a larger number of bytes when the absolute value of the value is increased. The bit string representing the value is formed by a bit string c obtained by dividing a bit string to be stored into multiple bit strings, each formed of seven bits in order from the front, and arranging the multiple bit strings in order from the rear side by switching the order of these bit strings as shown in FIG. 15B. Further, a bit c1 for indicating an end of the bit string c is added to a start of each of the bit strings each formed of seven bits. The bit c1 indicates the end of the bit string c when the bit c1 is "0."

An attribute having a hierarchical structure such as the stroke attribute or the like is described by a structure that has plural pairs of a key (k) and a value (V) arranged in each value, as shown in FIG. 15C. For example, in the example of FIG. 15C, a plurality of point attributes (key="1") and one stroke identification information attribute (key="2") are included in the value of the stroke attribute whose key is "4."

The description returns to FIG. 13. After including the character string for identifying the stroke data format S_Fmt by ASCII code in the part of A4 in FIG. 14, the ink file generating section 37 encodes a series of pieces of stroke data SD stored in the ink data retaining section 34 by the encoding system in accordance with the stroke data format S_Fmt (first format) (steps S403 and S404). As is clear from the processing flow shown in FIG. 3 and FIG. 4, a first to a (stroke_id−1)th piece of stroke data SD are stored within the ink data retaining section 34. The ink file generating section 37 sequentially encodes these pieces of stroke data SD according to the stroke data format S_Fmt.

The encoding of the stroke data SD according to the first format will be described in more detail. FIG. 16 is a processing flowchart of the stroke data encoding processing shown in step S404 in FIG. 13. As shown in the figure, the ink file generating section 37, which performs the stroke data encoding processing, first obtains the value of a view box attribute from the application 100 shown in FIG. 2, and encodes the value of the view box attribute together with the key (1) of the view box attribute in the form shown in FIG. 15B (step S4041). Next, the ink file generating section 37 obtains the value of an integer conversion precision information attribute from the application 100, and encodes the value of the integer conversion precision information attribute together with the key (2) of the integer conversion precision information attribute in the form shown in FIG. 15B (step S4042).

Next, the ink file generating section 37 encodes the key (3) and value of a style attribute (step S4043). Here, the style attribute has a hierarchical structure, as is understood from the description within the stroke data format S_Fmt (see FIG. 15A). Hence, the key (1) and the value of a line width attribute located in a lower layer are stored in each of the style attribute values, as in the example shown in FIG. 15C. As the value of the line width attribute, the style information obtained by the input processing section 31 in step S12 in FIG. 3 is used.

Next, the ink file generating section 37 encodes the key (4) of a stroke attribute (step S4044), and thereafter encodes the value of the stroke attribute (steps S4045 to S4052). Specifically, the key (1) of a point attribute is first encoded in relation to each of coordinates included within the stroke data SD (step S4045), and the value of the point attribute is next encoded (steps S4046 to S4048). The value of the point attribute is formed by a combination of point data PD and order information Uorder(PID).

Specifically, the value of the point attribute is encoded as follows. First, each of an x-coordinate and a y-coordinate is converted into an integer value by the following Equation (1) using the value of the integer conversion precision information attribute obtained in step S4042 (step S4046). Incidentally, $x_{float}$ and $y_{float}$ in Equation (1) respectively denote the X-coordinate and the y-coordinate of a floating point number type before the conversion. $X_{int}$ and $y_{int}$ respectively denote the x-coordinate and the y-coordinate of an integer type after the conversion. decimalPrecision denotes the value of the integer conversion precision information attribute. In addition, a symbol (int) at a start of a right side denotes a function of extracting only an integer part.

[Equation 1]

$$\left. \begin{array}{l} x_{int} = (\text{int})x_{float} * 10^{decimalPrecision} \\ y_{int} = (\text{int})y_{float} * 10^{decimalPrecision} \end{array} \right\} \quad (1)$$

Next, a differential value of each of the x-coordinate and the y-coordinate is derived (step S4047). As shown in the following Equation (2) and Equation (3), for a zeroth coordinate, the differential value is derived by outputting the value of the coordinate as the differential value, and for an ith coordinate, the differential value is derived by outputting, as the differential value, a value obtained by subtracting the value of the ith coordinate from an immediately preceding (i−1)th coordinate. Incidentally, $x_{diff}$ and $y_{diff}$ in Equation (2) and Equation (3) denote the differential values derived for the x-coordinate and the y-coordinate, respectively. The differential values are thus obtained and encoded after the conversion into the integer values in order to reduce an amount of data of the stroke data SD by performing entropy encoding, in which use of the variable length encoding method of the variable byte code described with reference to FIG. 15B or the like biases the probability of occurrence of a certain symbol (for example 0).

[Equation 2]

$$\left. \begin{array}{l} x_{diff}[0] = x_{int}[0] \\ y_{diff}[0] = y_{int}[0] \end{array} \right\} \quad (2)$$

$$\left. \begin{array}{l} x_{diff}[i] = x_{int}[i-1] - x_{int}[i] \\ y_{diff}[i] = y_{int}[i-1] - y_{int}[i] \end{array} \right\} ; i > 0 \quad (3)$$

After deriving the differential values, the ink file generating section 37 encodes the derived differential values and the order information Uorder(PID) (step S4048). Details of this encoding are described above with reference to FIGS. 15B and 15C.

The ink file generating section 37 repeats the processing of steps S4045 to S4048 for all of point data PD within the stroke data SD (step S4050). Then, after the processing for all of the point data PD is completed, the key (2) of a stroke identification information attribute is encoded (step S4051), and further the variable stroke_id(PID) is encoded as the value of the stroke identification information attribute (step S4052). The value of the stroke identification information attribute is thus information uniquely identifying the stroke data SD within the ink file 40. As a result of the above processing, the encoding of the key and value of the stroke attribute is completed. Thereafter, the ink file generating section 37 outputs the encoded series of pieces of data (step S4053).

The description returns to FIG. 13. After completion of the encoding of all of the stroke data SD, the ink file generating section 37 writes the series of pieces of data obtained by the encoding processing in steps S402 and S404 into the region A6 of the ink file 40 (see FIG. 14) (step S405). The generation of the ink chunk is thereby completed.

Here, FIG. 17 shows the stroke data SD in a case where the InkML format is used, as an example of a format (encoding method) different from the first format (first encoding method) described with reference to FIG. 15 and FIG. 16. In this case, the region A4 shown in FIG. 14 stores a character string such as "I," "N," "K," and "2," which is different from that in the case where the first format is used.

The stroke data SD in the InkML format is described in the XML format, and is described by arranging the series of pieces of point data PD in order within trace tags, as shown in FIG. 17. Incidentally, each piece of point data PD within trace tags is separated by commas (,), and each piece of point data PD is described in a form in which an X-coordinate, a Y-coordinate, style information (pen pressure information in the present example), and order information Uorder(PID) are separated from each other by spaces. On the other hand, the order information Uorder(PID) is not shown in the example of FIG. 17. FIG. 17 shows five pieces of stroke data SD0 to SD4 whose stroke identification information attributes are "sd0" to "sd4," respectively. The stroke data SD in the InkML format is stored within the region A6 of the ink file 40 in a state in which characters constituting XML are encoded by the encoding processing of UTF-8 or the like.

The description returns to FIG. 13. After completion of the generation of the ink chunk, the ink file generating section 37 performs processing of grouping the stroke data SD by logical name LN (step S406). The grouping processing is performed to reduce an amount of data of the metadata chunk.

<Grouping Processing>

Figure 18:
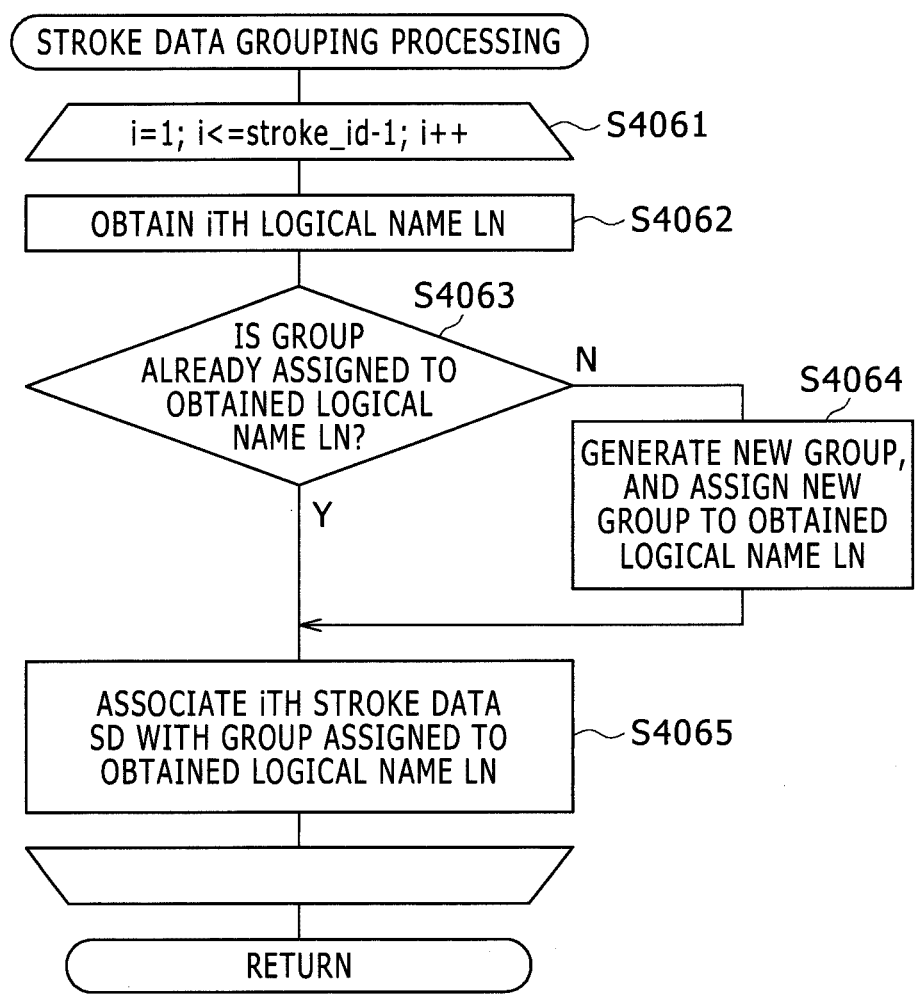
FIG. 18 is a processing flowchart of stroke data grouping processing shown in step S406 in FIG. 13.

FIG. 18 is a processing flowchart of the stroke data grouping processing shown in step S406 in FIG. 13. As shown in the figure, this processing is performed sequentially for each of a first to a (stroke_id−1)th logical name LN stored in the ink data retaining section 34 (step S4061). Specifically, the ink file generating section 37 first obtains an ith logical name LN from the ink data retaining section 34 (step S4062), and determines whether or not a group is already assigned to the logical name LN (step S4063). When no group is assigned (negative determination in step S4063), the ink file generating section 37 creates a new group, and assigns the new group to the logical name LN obtained in step S4062 (step S4064). When it is determined that a group is already assigned in step S4063 and when the processing of step S4064 is ended, the ith stroke data SD retained in the ink data retaining section 34 is associated with the group assigned to the logical name LN obtained in step S4062 (step S4065). After the above processing up to the (stroke_id−1)th logical name LN is ended, each piece of stroke data SD is in a state of being associated with one of the groups.

The description returns to FIG. 13. After ending the stroke data grouping processing, the ink file generating section 37 generates, for each group generated in step S406, a metadata block that associates one or a plurality of pieces of stroke data SD with the logical name LN (steps S407 and S408).

FIG. 19 is a diagram showing an example of the metadata chunk. This metadata chunk is described in the XMP format, which uses the XML format. As shown in the figure, the metadata chunk includes two metadata blocks B1 and B2. In step S408 in FIG. 13, such metadata block is generated for each group.

<Generation of Metadata Block>

The metadata block is information retained in the metadata chunk, separate from the stroke data chunk, in order to perform N:M association of M (M is an integer of 1 or more) pieces of stroke data generated by the stroke data generating section 32 with N kinds (N is an integer of 1 or more and M or less) of metadata generated by the metadata generating section 33, wherein the N kinds of metadata respectively identify N kinds of input devices, such as electronic pens or the like.

A description B1a within the metadata block B1 shown in FIG. 19 represents a corresponding logical name LN ("David Smith" in this case). In addition, a description B1b within the metadata block B1 represents the value (first to fifth in this case) of a stroke identification information attribute assigned to each of one or more pieces of stroke data SD corresponding to the logical name LN "David Smith." In the present example, there are two kinds (N=2) of metadata. In addition, based on these descriptions B1a and B1b, the metadata block B1 functions as information associating the logical name LN (first metadata) identifying the electronic pen $P_A$ (first input device) with a first group formed by grouping one or more pieces of stroke data SD (first stroke data) generated by the electronic pen $P_A$ (group identified by the values of the stroke identification information attributes described within the description B1b).

Similarly, a description B2a within the metadata block B2 represents a corresponding logical name LN ("Greg Nelson" in this case). A description B2b within the metadata block B2 represents the value (sixth to ninth in this case) of a stroke identification information attribute assigned to each of one or more pieces of stroke data SD corresponding to the logical name LN "Greg Nelson." Based on these descriptions B2a and B2b, the metadata block B2 functions as information associating the logical name LN (second metadata) identifying the electronic pen $P_B$ (second input device) with a second group formed by grouping one or more pieces of stroke data SD (second stroke data) generated by the electronic pen $P_B$ (group identified by the values of the stroke identification information attributes described within the description B2b).

In this case, in the metadata blocks B1 and B2 shown in FIG. 19, each of the above-described first and second groups is identified by a start number and an end number of the stroke identification information attribute assigned to each of the corresponding one or more pieces of stroke data SD. Such identifying method is realized due to a fact that the stroke identification information attribute assigned to each of one or more pieces of stroke data SD corresponding to each group is data formed from consecutive numbers. When the stroke identification information attribute assigned to each of one or more pieces of stroke data SD corresponding to each group is data formed from inconsecutive numbers, it suffices to renumber the corresponding stroke identification information attributes into consecutive numbers, or identify the group by enumerating the corresponding stroke identification information attributes.

The description returns to FIG. 13. After completion of the generation of metadata blocks for all of the groups, the ink file generating section 37 generates the metadata chunk as a whole as illustrated in FIG. 19 on the basis of the generated metadata blocks, encodes the metadata chunk by the second format different from the first format, and then writes the metadata chunk into the region A9 of the ink file 40 (see FIG. 14) (step S409). As a result of the above processing, the generation of the ink file 40 is completed.

As described above, the ink file output method according to the present embodiment can store the logical names LN and the stroke data SD in association with each other within the ink file 40. Hence, when the ink file 40 is reproduced, a logical name LN and stroke data SD can be associated with each other on the basis of the information written within the ink file 40. The processing of reproducing the ink file 40 depending on (according to) the logical name LN, that is, the electronic pen P can therefore be realized.

In addition, in a case where the particular stroke data encoding method is not supported, it becomes possible to determine whether or not stroke data written by a particular input device is included in the ink file before attempting to decode the stroke data.

Reproduction of the ink file 40 as described above will be described in the following with reference to FIGS. 20 to 22.

<Processing of Reproducing Ink File 40>

Figure 20:
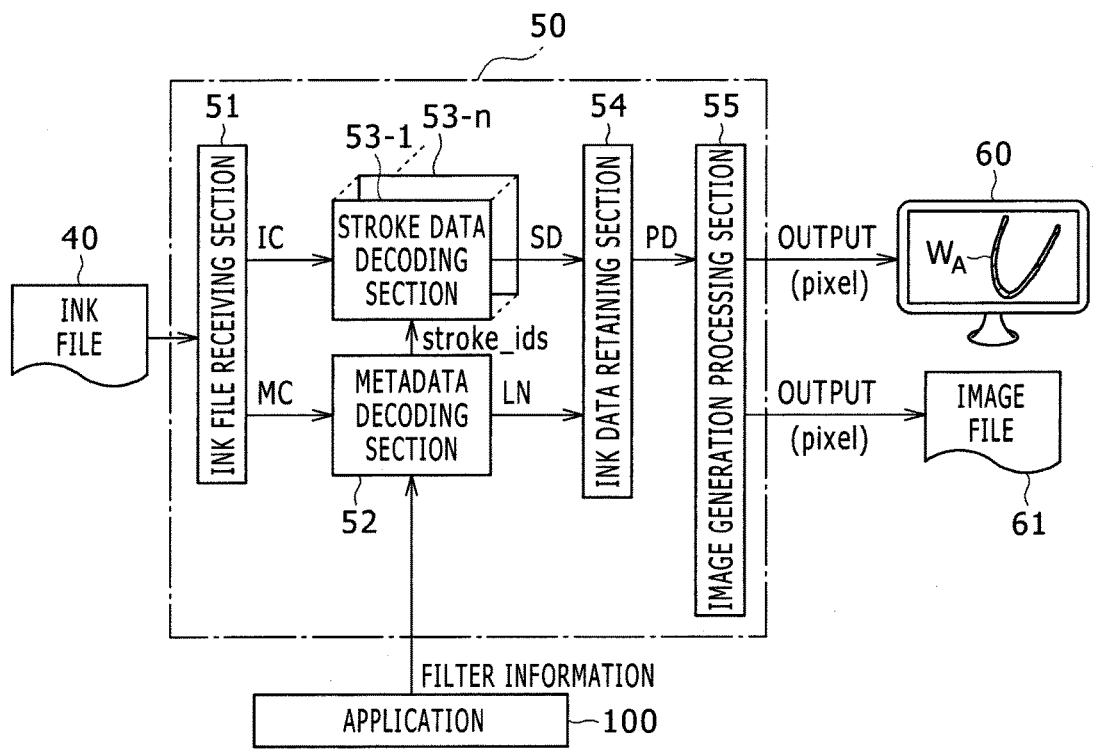
FIG. 20 is a functional block diagram of a digital ink reproducing device 50 shown in FIG. 1.

FIG. 20 is a functional block diagram of the digital ink reproducing device 50 shown in FIG. 1. As shown in the figure, the digital ink reproducing device 50 functionally includes an ink file receiving section 51, a metadata decoding section 52, stroke data decoding sections 53-1 to 53-n, an ink data retaining section 54, and an image generation processing section 55.

The ink file receiving section 51 is a functional unit that receives an input of the ink file 40 generated by the digital ink generating device 30. The ink file receiving section 51 is configured to output the metadata chunk MC and the ink chunk IC included in the ink file 40 to the metadata decoding section 52 and the stroke data decoding sections 53-1 to 53-n, respectively.

The metadata decoding section 52 is a functional unit that decodes the metadata chunk MC, and which receives an input of filter information from the application 100. The filter information is information identifying one or more logical names LN. The filter information is specified by the user, for example. According to the filter information, the metadata decoding section 52 extracts stroke identification information stroke_id to be reproduced from the decoded metadata chunk MC. In addition, the metadata decoding section 52 identifies the encoding system of the ink chunk IC from a description in the metadata chunk MC. The metadata decoding section 52 is configured to then supply the extracted stroke identification information stroke_id to a stroke data decoding section 53 corresponding to the identified encoding system.

To describe the above-described processing by the metadata decoding section 52 by referring to a concrete example, when filter information "David Smith" is specified for the ink file 40 having the metadata chunk shown in FIG. 19, for example, the metadata decoding section 52 extracts first to fifth stroke identification information stroke_id. In addition, it can be understood from a description within the metadata chunk shown in FIG. 19 that the ink chunk IC is encoded by WILL. The metadata decoding section 52 therefore supplies the extracted first to fifth stroke identification information stroke_id to a stroke data decoding section 53 corresponding to WILL.

In addition, the metadata decoding section 52 supplies the one or more logical names LN specified by the filter information to the ink data retaining section 54.

As with the stroke data encoding sections 35-1 to 35-n shown in FIG. 2, the stroke data decoding sections 53-1 to 53-n correspond to respective formats (encoding systems) different from each other. Each stroke data decoding section 53 is configured to decode the ink chunk IC supplied from the ink file receiving section 51 on the basis of the corresponding encoding system in response to the supply of one or more pieces of stroke identification information stroke_id from the metadata decoding section 52. At this time, as for the part corresponding to the stroke data SD within the ink chunk IC, only the stroke data SD corresponding to the one or more pieces of stroke identification information stroke_id supplied from the metadata decoding section 52 is set as an object of decoding processing. This is intended to reduce processing load (overhead) of the decoding processing. The stroke data decoding section 53 is configured to then output a decoding result of each of the decoded one or more pieces of stroke data SD to the ink data retaining section 54.

The ink data retaining section 54 is configured to extract a series of pieces of point data PD and order information Uorder(PID) from the stroke data SD supplied from the stroke data decoding section 53, and supply the series of pieces of point data PD and the order information Uorder (PID) to the image generation processing section 55. The image generation processing section 55 is configured to generate, on the basis of the series of pieces of point data PD and the order information Uorder(PID) thus supplied, a video signal to be displayed on the display 60 or an image file 61 as raster data.

Figure 21:
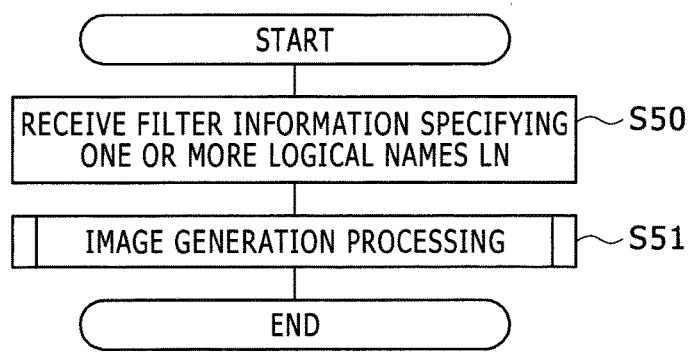
FIG. 21 is a processing flowchart showing a main routine of processing of generating an image according to filter information shown in FIG. 20.

FIG. 21 is a processing flowchart showing a main routine of processing of reproducing the ink file 40. The processing performed by the digital ink reproducing device 50 will be described again in the following in more detail with reference to the figure.

As shown in FIG. 21, the digital ink reproducing device 50 first receives filter information specifying one or more logical names LN (step S50). Next, image generation processing (step S51) is performed on the basis of the filter information.

Figure 22:
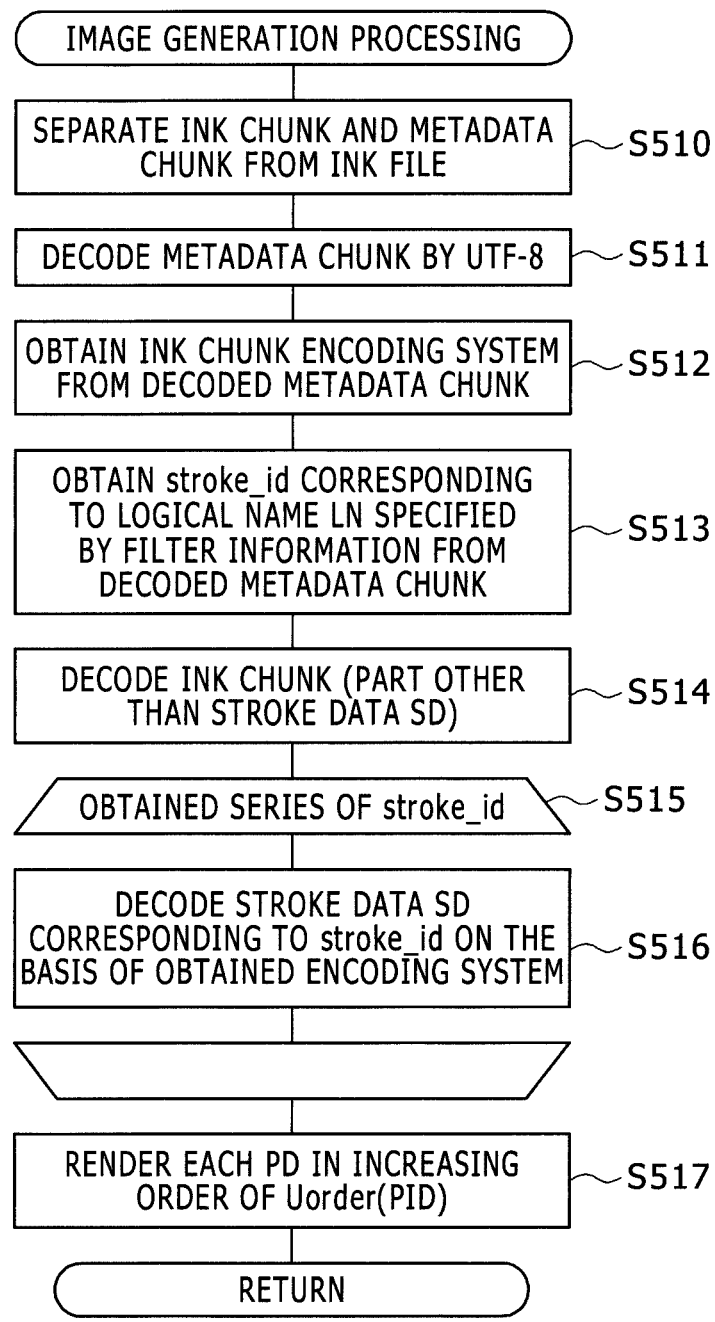
FIG. 22 is a processing flowchart of image generation processing shown in step S51 in FIG. 21.

FIG. 22 is a processing flowchart of the image generation processing shown in step S51 in FIG. 21. As shown in the figure, in this processing, the ink file receiving section 51 first extracts the ink chunk IC and the metadata chunk MC from the ink file 40 (step S510). Next, the metadata decoding section 52 decodes the metadata chunk MC encoded by UTF-8 (step S511). The metadata decoding section 52 thereafter obtains the encoding system of the ink chunk IC from the decoded metadata chunk MC (step S512), and obtains the stroke identification information stroke_id of the stroke data SD corresponding to a logical name LN specified by the filter information from the decoded metadata chunk MC (step S513).

Next, the stroke data decoding section 53 corresponding to the encoding system obtained in step S512 decodes the ink chunk (step S514). A part decoded here is a part corresponding to the stroke data format S_Fmt encoded in step S402 in FIG. 13, for example. Next, the stroke data decoding section 53 decodes one or more pieces of stroke data SD corresponding to the series of pieces of stroke identification information stroke_id obtained in step S513 on the basis of the encoding system obtained in step S512 (steps S515 and S516). Finally, the image generation processing section 55 renders the thus decoded series of pieces of stroke data SD. At this time, rather than rendering the pieces of stroke data SD one by one (in the stroke unit), the image generation processing section 55 renders coordinates in increasing order according to the order information Uorder(PID) stored in association with point data PD (in the stroke segment unit) within each piece of stroke data SD (see FIG. 12B). As a result of the above, the image generation processing shown in step S51 in FIG. 21 is ended.

As described above, according to the ink file reproducing method according to the present embodiment, when the ink file 40 generated by the ink file output method according to the present embodiment is reproduced, only the stroke data SD corresponding to the logical name LN specified by the filter information can be set as an object of rendering.

In addition, when the ink file 40 generated by the ink file output method according to the present embodiment is reproduced, it is possible to determine in advance whether or not the stroke data corresponding to the logical name LN specified by the filter information is included.

In addition, the stroke data decoding section 53 decodes only the stroke data SD corresponding to the logical name LN specified by the filter information. Thus, processing load (overhead) required for the decoding can be reduced as compared with a case where only after the entire ink chunk IC is decoded can the stroke data SD corresponding to the logical name LN specified by the filter information be selected.

In addition, the order of rendering of coordinates is stored within the stroke data SD by storing order information Uorder(PID) in association with the respective coordinates within the stroke data SD when the ink file is generated. As such, at a time of reproduction of the ink file, the coordinates are rendered according to the rendering order. Thus, complex before-and-after relation among a plurality of pieces of stroke data SD, as illustrated in FIG. 11 for example, can be reproduced.

Figures 23, 24:
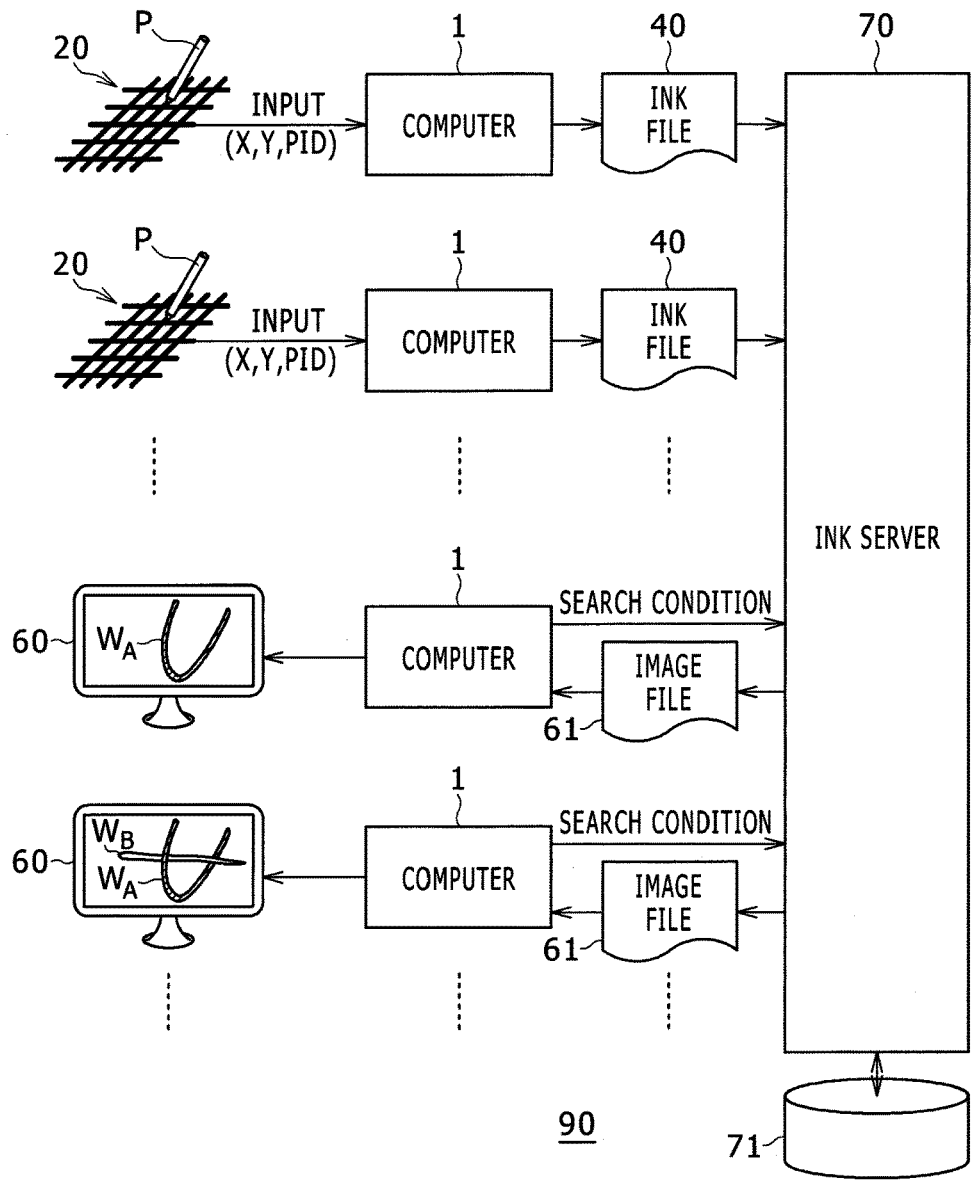
FIG. 23 is a diagram showing a system configuration of a computer system 90 according to a second embodiment of the present invention.
FIG. 24 is a diagram showing an example of an ink table stored in a storage 71 shown in FIG. 23.

Description will next be made of an ink file managing method according to a second embodiment of the present invention. FIG. 23 is a diagram showing a system configuration of a computer system 90 that implements the ink file managing method according to an embodiment of the present embodiment. As shown in the figure, the computer system 90 includes a plurality of computers 1 and an ink server 70 (ink file managing device).

Each computer 1 is similar to that described in the first embodiment. Each computer 1 is coupled to a position detector 20 or a display 60, and is configured to be able to generate and reproduce an ink file 40. However, in the present embodiment, the ink server 70 reproduces the ink file 40. Therefore each computer 1 does not necessarily need to include the digital ink reproducing device 50 shown in FIG. 1. In addition, as shown in FIG. 23, computers 1 according to the present embodiment are configured to output a search condition for searching for an ink file 40 to the ink server 70 and receive an image file 61 supplied from the ink server 70 in response. The image file 61 is the same as shown in FIG. 1. Incidentally, FIG. 23 is drawn such that position detectors 20 are coupled to only two computers 1 in the upper portion of FIG. 23, and displays 60 are coupled also to only two computers 1 in lower portion of FIG. 23. The drawing is for convenient illustrative purposes only, and a display 60 may be coupled to a computer 1 to which a position detector 20 is coupled, or a position detector 20 may be coupled to a computer 1 to which a display 60 is coupled.

The ink server 70 is a server that implements a service known as a cloud service. The ink server 70 has the configuration (not shown) of an ordinary server computer, which includes a CPU, a communication circuit, a storage device, and the like. The storage device includes a main storage device such as a main memory or the like and an auxiliary storage device such as a hard disk or the like. Each function of the ink server 70 is implemented by the operation of the CPU according to a program stored in the storage device.

A storage 71 as an external storage device is coupled to the ink server 70. When an ink file 40 is transmitted (uploaded) from a computer 1 to the ink server 70 by a user operation on the computer 1, the ink server 70 stores the received ink file 40 in the storage The storage 71 stores an ink table illustrated in FIG. 24, in addition to the thus stored ink file 40. As shown in FIG. 24, the ink table is a table storing, for each ink file 40, the file name of the ink file 40 (information identifying the ink file 40), information indicating the account of the user who uploaded the ink file 40 (for example, an account for logging into the ink server 70), one or more logical names LN described within a metadata chunk stored in the ink file 40, one or more pieces of logical identification information LID each corresponding to the one or more logical names LN, and the encoding system (WILL, InkML, or the like) of stroke data SD stored in the ink file 40.

When the ink server 70 receives the ink file 40 from the computer 1, the ink server 70 obtains the one or more logical names LN described within the metadata chunk and the encoding system of the stroke data SD by decoding the ink file 40. Then, the one or more logical names LN and the encoding system of the stroke data SD are additionally written to the ink table together with the file name and the information indicating the account of the user.

Here, the ink file 40 described in the first embodiment may not include the description of logical identification information LID. In this case the ink server 70 cannot obtain the logical identification information LID when decoding the ink file 40. Hence, when using the ink file 40 described in the first embodiment, the ink server 70 needs to obtain the logical identification information LID of each logical name LN from the computer 1 separately from the ink file 40. On the other hand, when using the ink file 40 that includes the description of the logical identification information LID, it suffices for the ink server 70 to obtain the logical identification information LID from the description within the ink file 40 as in the case of the above-described logical name LN.

When one or both of the logical name LN and the logical identification information LID cannot be obtained, it suffices for the ink server 70 to leave the corresponding field or fields in the ink table blank. In addition, it is not essential to provide the column of logical identification information LID in the ink table. When logical identification information LID need not to be used as one of search conditions, the column of logical identification information LID may be omitted from the ink table.

Figure 25:
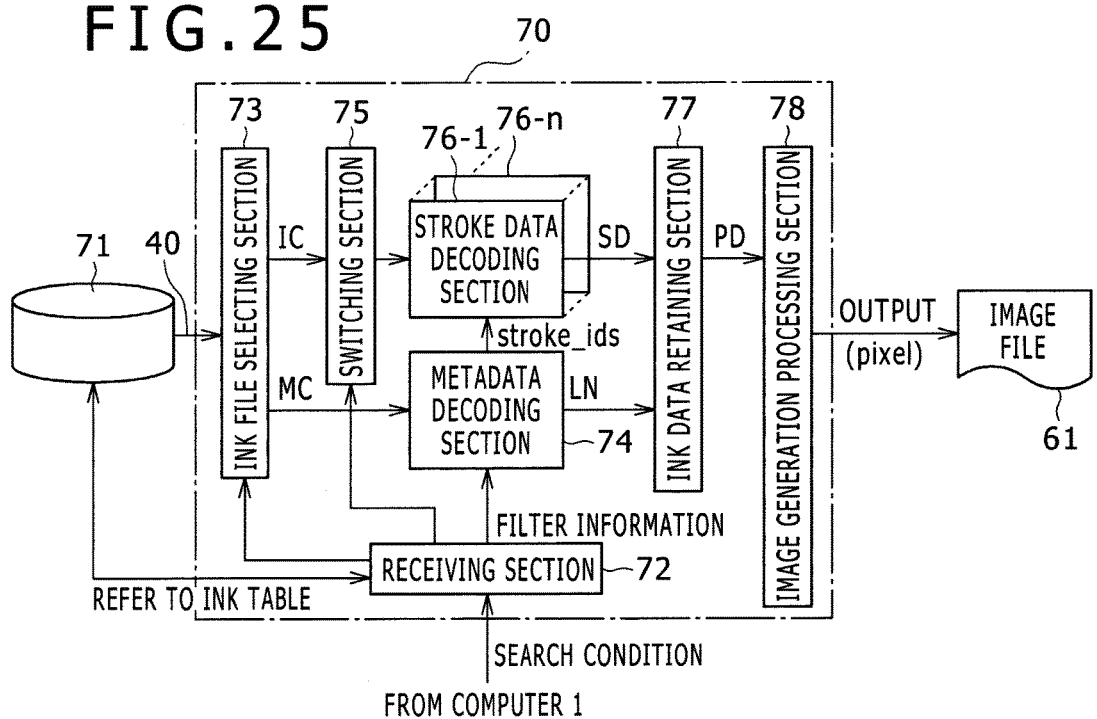
FIG. 25 is a functional block diagram of an ink server 70 shown in FIG. 23.

FIG. 25 is a diagram showing functional blocks of the ink server 70. As shown in the figure, the ink server 70 functionally includes an ink file selecting section 73, a metadata decoding section 74, a switching section 75, stroke data decoding sections 76-1 to 76-n, an ink data retaining section 77, and an image generation processing section 78.

The ink file selecting section 73 is a functional unit that selects one or more ink files 40 from among one or more ink files 40 already stored in the storage 71. In addition, a receiving section 72 is a functional unit that receives, from a computer 1, an input of a search condition specifying one or more of a file name, an account, a logical name LN, logical identification information LID, and an encoding system shown in FIG. 24.

The receiving section 72 identifies an ink file 40 meeting the condition specified by the search condition in reference to the ink table within the storage 71 and makes the ink file selecting section 73 select the ink file 40. In addition, the receiving section 72 is configured to notify the switching section 75 of an ink chunk encoding system corresponding to the identified ink file 40, and when a logical name LN or logical identification information LID is specified, to output filter information identifying the specified logical name LN or the specified logical identification information LID to the metadata decoding section 74. The filter information is similar to the filter information described with reference to FIG. 20. Incidentally, when neither of the logical name LN and the logical identification information LID is specified in the search condition, the filter information does not need to be output. In addition, the ink file selecting section 73 is configured to output a metadata chunk MC and an ink chunk IC included in the selected ink file 40 to the metadata decoding section 74 and the switching section 75, respectively.

The metadata decoding section 74 is a functional unit that decodes the metadata chunk MC supplied from the ink file selecting section 73, and when supplied with the filter information from the receiving section 72, extracts only the stroke identification information stroke_id to be reproduced from the decoded metadata chunk MC according to the filter information. Functions of the metadata decoding section 74 are similar to those of the metadata decoding section 52 shown in FIG. 20, and therefore detailed description thereof will be omitted.

Here, the ink file 40 described in the first embodiment may not include logical identification information LID within metadata thereof. In such case, when logical identification information LID is specified by the filter information, the metadata decoding section 74 cannot extract stroke identification information stroke_id properly. The specification of the logical identification information LID by the filter information is effective only when the logical identification information LID is stored within the metadata of the ink file 40.

The switching section 75 is a functional unit that supplies the ink chunk IC supplied from the ink file selecting section 73 to a stroke data decoding section corresponding to the encoding system notified from the receiving section 72 among the stroke data decoding sections 76-1 to 76-n. The stroke data decoding section 76 decodes the ink chunk IC supplied from the ink file selecting section 73 using the corresponding encoding system. At this time, within the ink chunk IC, only the stroke data SD corresponding to the one or more pieces of stroke identification information stroke_id supplied from the metadata decoding section 74 is set as an object for the decoding processing. As in the case of the above-described stroke data decoding section 53, this is intended to reduce processing load (overhead) of the decoding processing. The stroke data decoding section 76 is configured to then output the decoded one or more pieces of stroke data SD to the ink data retaining section 77.

As with the ink data retaining section 54 shown in FIG. 20, the ink data retaining section 77 is configured to extract a series of pieces of point data PD and order information Uorder(PID) from the stroke data SD supplied from the stroke data decoding section 76 and supply the series of pieces of point data PD and the order information Uorder (PID) to the image generation processing section 78. The image generation processing section 78 is configured to perform drawing processing on the basis of the series of pieces of point data PD and the order information Uorder (PID) thus supplied, to thereby generate an image file 61 as raster data for each ink file 40.

The ink server 70 transmits one or more image files 61 generated as described above to the computer 1 in response to the received search condition. The user of the computer 1 can thereby obtain, or view on the display 60, the image file 61 of each of the one or more ink files 40 matching contents specified by the search condition. In addition, when a logical name LN or logical identification information LID is specified in the search condition, each image file 61 can be formed with only the stroke data SD corresponding to the specified logical name LN or the specified logical identification information LID.

Figure 26:
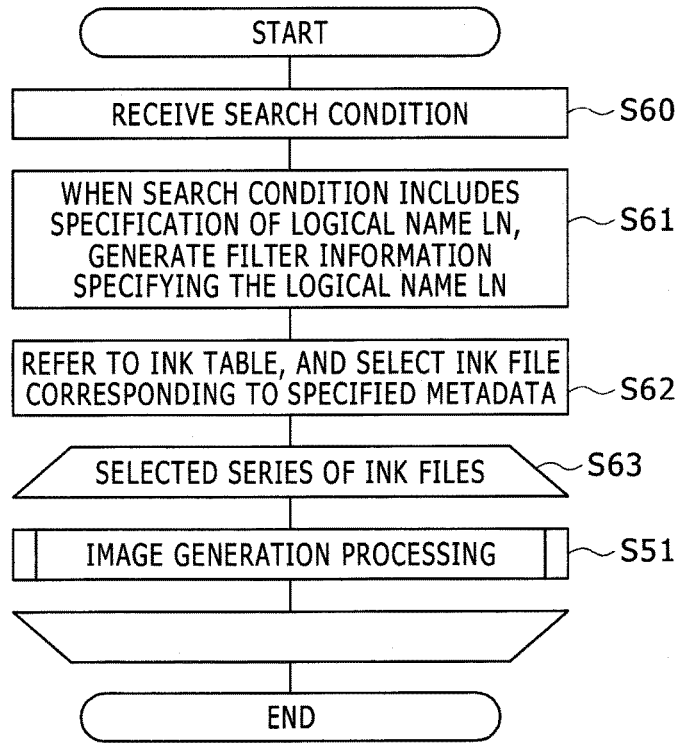
FIG. 26 is a processing flowchart showing a main routine of ink file reproduction processing by the ink server 70 shown in FIG. 23.

FIG. 26 is a processing flowchart showing a main routine of processing in which the ink server 70 reproduces an ink file 40. The processing performed by the ink server 70 will be described again in the following in more detail with reference to the figure. Incidentally, the sample routine in FIG. 26 assumes a case where logical identification information LID may or may not be specified in a search condition.

As shown in FIG. 26, the ink server 70 first receives an input of a search condition from a computer 1 (step S60). Then, when the search condition includes a specification of a logical name LN, the ink server 70 generates filter information specifying the logical name LN (step S61).

Next, the ink server 70 refers to the ink table within the storage 71, and obtains the file name of each of one or more ink files 40 matching the search condition. The ink server 70 then selects the one or more ink files 40 each corresponding to the obtained file name from one or more ink files 40 stored within the storage 71 (step S62).

The image generation processing described with reference to FIG. 22 is thereafter performed for each of the series of ink files 40 selected in step S62 (steps S63 and S51). The image file 61 of each of the one or more ink files 40 matching the contents specified by the search condition is thereby generated. In addition, each image file 61 in the case where the logical name LN or logical identification information LID is specified in the search condition is formed with only the stroke data SD corresponding to the specified logical name LN or the specified logical identification information LID.

As described above, the ink file managing method according to the present embodiment allows for use of an input device, in reference to a logical name LN, logical identification information LID, or the like, as a search condition to search for (or in) an ink file 40. That is, it becomes possible to specify an input device as one of search conditions in a search for an ink file 40.

In addition, according to the ink file managing method according to the present embodiment, when a logical name LN or logical identification information LID is specified as a search condition, each image file 61 output as a result of a search can be formed with only the stroke data SD corresponding to the specified logical name LN or the specified logical identification information LID.

Figure 27:
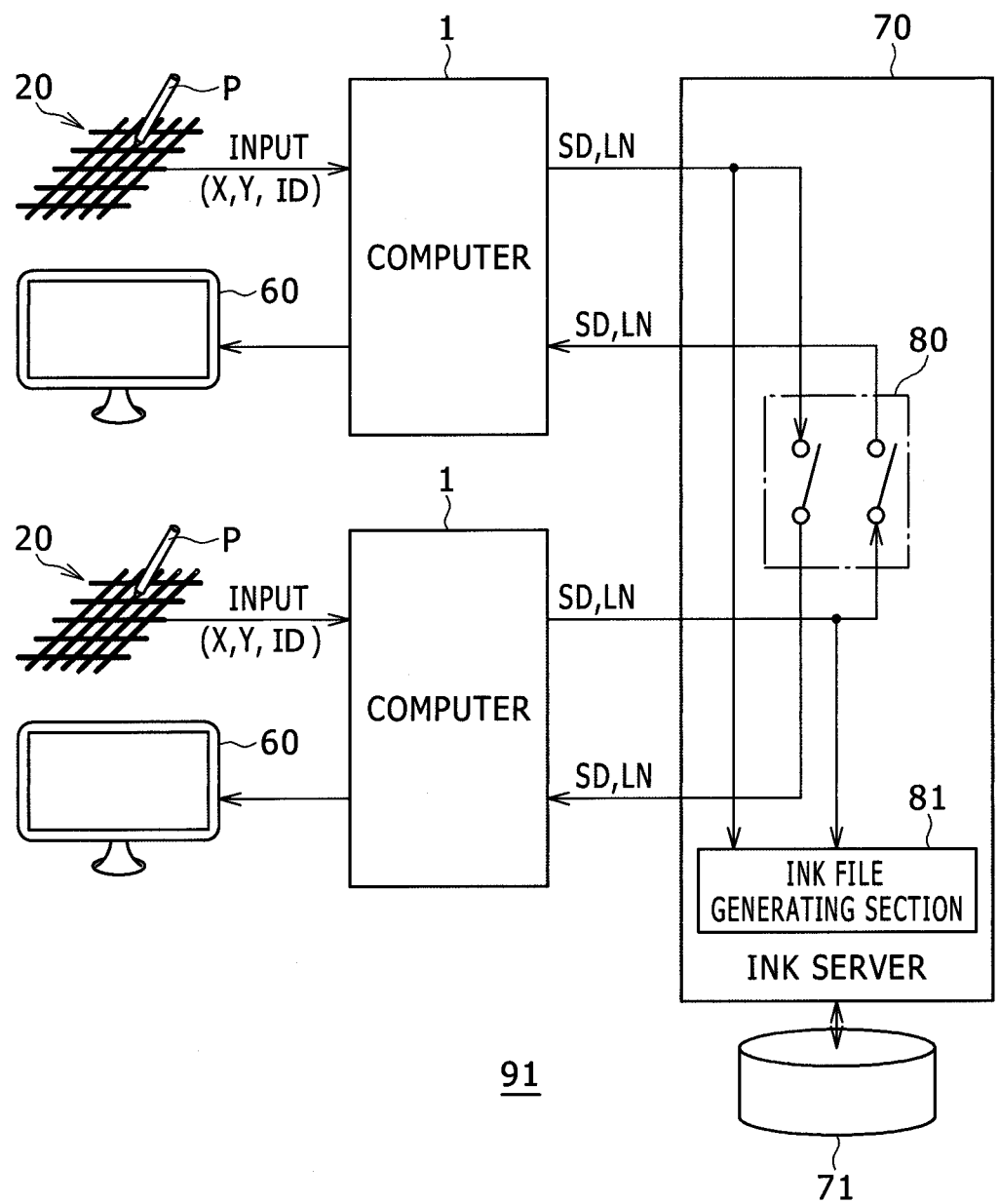
FIG. 27 is a diagram showing a system configuration of a computer system 91 according to a third embodiment of the present invention.

Description will next be made of an ink file output method according to a third embodiment of the present invention. FIG. 27 is a diagram showing a system configuration of a computer system 91 according to the present embodiment. As is understood from comparison of FIG. 27 with FIG. 23, as with the computer system 90 according to the second embodiment, the computer system 91 according to the present embodiment includes a plurality of computers 1 and an ink server 70. However, rather than performing all of processes of generating an ink file 40 within a computer 1, the computer system 91 according to the present embodiment is configured to perform processes up to the generation of stroke data SD and a logical name LN in each computer 1, and perform subsequent processes including encoding within the ink server 70. In addition, the computer system 91 according to the present embodiment is configured to enable the users of the plurality of computers 1 to generate one ink file 40 simultaneously. In FIG. 27, each computer 1 has functions similar to those of the computers 1 described in the second embodiment with respect to the specification of a search condition and the reception of an image file 61. Detailed description will be made in the following centering on differences between the first and second embodiments.

Each computer 1 is configured to transmit stroke data SD, which may be retained in the ink data retaining section 34 among the functional blocks of the ink file generating device 30 shown in FIG. 2, to the ink server 70 at predetermined time intervals together with the corresponding logical name LN.

The ink server 70 includes a transfer filter 80 and an ink file generating section 81. The transfer filter 80 is provided between the plurality of computers 1, which are used to generate one ink file 40 simultaneously. The transfer filter 80 has a configuration including a switch inserted between an up line from each computer 1 and a down line to each other computer 1. When the switch is on, stroke data SD and a logical name LN uploaded from each computer 1 are transferred to the other computer 1 in real time. Each computer 1 is configured to display the stroke data SD and the logical name LN thus transferred in real time on a display 60 together with stroke data SD and a logical name LN generated by the computer 1 itself. The user of each computer 1 can thereby experience generating one ink file 40 simultaneously (and collaboratively) with a user present at a remote place. In addition, the display of the logical name LN together with the stroke data SD enables the user of each computer 1 to determine which entity is drawing the stroke data SD being displayed.

The stroke data SD and the logical name LN uploaded from each computer are supplied to the ink file generating section 81 within the ink server 70. The ink file generating section 81 is configured to temporarily retain the stroke data SD and the logical name LN that are supplied. The ink file generating section is configured to start to generate an ink file 40 on the basis of the stroke data SD and the logical name LN that are retained, using an instruction received from one of the computers 1 to output the ink file 40 as a trigger.

The processing of generating the ink file 40 by the ink file generating section 81 is basically similar to the processing by the ink file generating section 37 shown in FIG. 2. However, the ink file generating section 81 may receive an input of the encoding system of stroke data SD from each of multiple users, and encode the stroke data SD according to the input. In this case, pieces of stroke data SD encoded by encoding systems different from each other are mixed with each other within one ink file 40.

FIG. 28 is a diagram showing an example of an ink table generated in the present embodiment. Three files corresponding to file names #F1 to #F3 are also stored in the ink table of FIG. 24, and two files corresponding to file names #F4 and #F5 are files characteristic of the present embodiment.

For example, descriptions within the ink table in relation to the file name #F4 are obtained in a case where David Smith generates stroke data SD using two electronic pens P whose logical identification information LID are "Pid#1" and "Pid#2," respectively, on a computer 1 that has logged in to the ink server 70 under an account #AC1, and where Greg Nelson simultaneously generates stroke data SD using an electronic pen P whose logical identification information LID is "Pid#3" on another computer 1 that has logged in to the ink server 70 under an account #AC2, wherein David Smith specifies WILL as the encoding system of the stroke data SD and Greg Nelson specifies InkML as the encoding system of the stroke data SD. Configuring the ink table as in FIG. 28 enables an appropriate search to be made for one ink file 40 generated simultaneously by a plurality of users on computers 1 different from each other. Such search can be specified (requested) based on search conditions such as an account, a logical name LN, logical identification information LID, the encoding system of stroke data SD, or the like, at the time of reproduction of the ink file 40.

As described above, the ink file output method according to the present embodiment can provide the user of each computer 1 with an experience of generating one ink file 40 simultaneously with a user located at a remote place. In addition, at the time of reproduction of the ink file 40, an appropriate search can be made for the thus generated ink file 40 according to search conditions such as an account, a logical name LN, logical identification information LID, the encoding system of stroke data SD, or the like.

Preferred embodiments of the present invention have been described above. However, the present invention is not limited to these embodiments. The present invention can be carried out in various further modes without departing from the spirit of the present invention.

Figure 29:
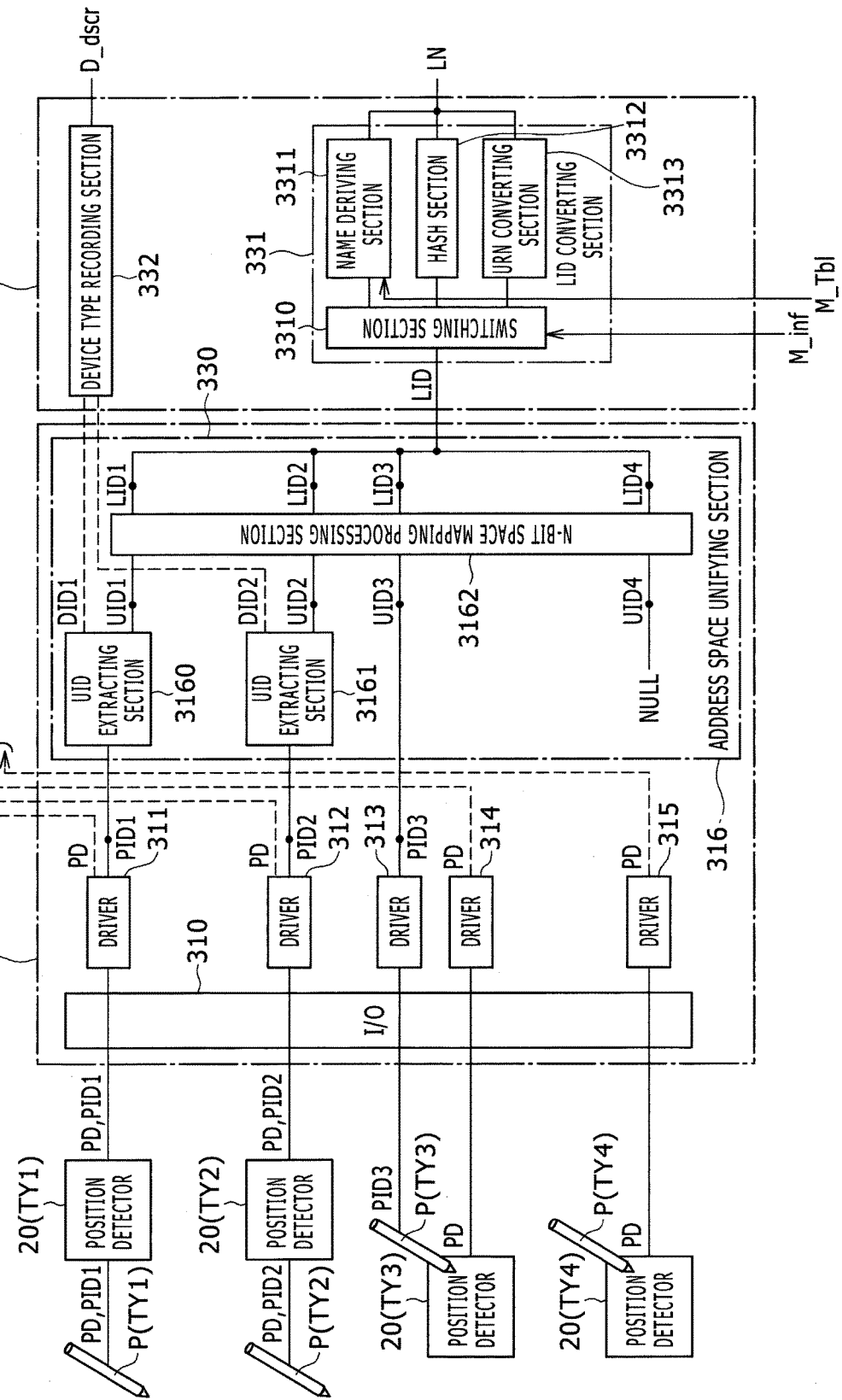
FIG. 29 is a diagram showing a modification of the internal configuration of the input processing section 31 and the metadata generating section 33 shown in FIG. 2.

For example, in FIG. 5, the address space unifying section 330 is implemented as a part of the functions of the metadata generating section 33. However, as shown in FIG. 29, the address space unifying section 330 can also be implemented as a part of the input processing section 31. This enables the address space unifying section 330 to be implemented on the device driver side.

While pen pressure information is not used in the processing of generating an ink file 40 as described with reference to FIG. 3 and FIG. 4, pen pressure information may be used in other embodiments. In this case, the pen pressure information is transmitted from the position detector 20 together with point data PD and the like. It suffices for the digital ink generating device 30 to embed, within the stroke data SD, the pen pressure information as a part of the value of the point attribute (point) shown in FIG. 15A.

In addition, with regard to the rendering of an ink file 40 described in the third embodiment, identification of the encoding system of stroke data SD may be included in the filter information. In other words, while the third embodiment has been described above in reference to an ink file 40 including a plurality of pieces of stroke data SD encoded by encoding systems different from each other, in reproducing such ink file 40, the digital ink reproducing device 50 (see FIG. 20) described in the first embodiment or the reproducing function of the ink server 70 (see FIG. 25) described in the second embodiment cannot extract and reproduce only the stroke data SD encoded by a particular encoding system from one ink file 40. This is because the filter information described in the first and second embodiments includes only metadata such as a logical name LN or logical identification information LID, and does not identify the encoding system of stroke data SD. When identification of the encoding system of stroke data SD is included in filter information, in reproducing an ink file 40 including a plurality of pieces of stroke data SD encoded by different encoding systems, it is possible to extract only the stroke data SD encoded by a particular encoding system specified by the filter information and to set the extracted stroke data SD as an object of rendering processing.

DESCRIPTION OF REFERENCE SYMBOLS

1 Computer
20 Position detector
30 Digital ink generating device
31 Input processing section
32 Stroke data generating section
33 Metadata generating section
34 Ink data retaining section
35-1 to 35-$n$ Stroke data encoding section
36 Metadata encoding section
37 Ink file generating section
40 Ink file
50 Digital ink reproducing device
51 Ink file receiving section
52 Metadata decoding section
53-1 to 53-$n$ Stroke data decoding section 54 Ink data retaining section
55 Image generation processing section
60 Display
61 Image file
70 Ink server
71 Storage
72 Receiving section
73 Ink file selecting section
74 Metadata decoding section
75 Switching section
76-1 to 76-n Stroke data decoding section
77 Ink data retaining section
78 Image generation processing section
80 Transfer filter
81 Ink file generating section
90, 91 Computer system
100 Application
310 Input-output interface
311 to 315 Driver
330 Address space unifying section
331 LID converting section
332 Device type recording section
3300, 3301 UID extracting section
3302 N-bit space mapping processing section
3310 Switching section
3311 Name deriving section
3312 Hash section
3313 URN converting section
B1, B2 Metadata block
P Electronic pen

The invention claimed is:

1. A method of outputting an ink file, the method comprising:
generating M (M is an integer of 1 or more) pieces of stroke data on a basis of event data generated as input devices move, respectively;
encoding the M pieces of stroke data together with stroke identifications (ids), using a first encoding scheme involving data compression, into a first format specified by an application program;
generating a metadata block as information associating the M pieces of stroke data encoded in the first encoding scheme with N (N is an integer of 1 or more and M or less) kinds of metadata, wherein values of the stroke ids are associated with the N kinds of metadata;
encoding the metadata block including the values of the stroke ids, using a second encoding scheme different from the first encoding scheme, into a second format, which is an Extensible Markup Language (XML) format and is different from the first format; and
writing the M pieces of stroke data and the stroke ids encoded in the first encoding scheme and the metadata block including the values of the stroke ids encoded in the second encoding scheme to the ink file.

2. The method of outputting the ink file according to claim 1,
wherein the ink file includes an ink chunk including the M pieces of stroke data and the stroke ids encoded in the first encoding scheme and a metadata chunk including the metadata block including the values of the stroke ids encoded in the second encoding scheme.

3. The method of outputting the ink file according to claim 1,
wherein the ink file includes, as the M pieces of stroke data, one piece of first stroke data generated by a first input device and one piece of second stroke data generated by a second input device, and
the metadata block is information associating a first metadata identifying the first input device with the one piece of first stroke data, and associating a second metadata identifying the second input device with the one piece of second stroke data.

4. The method of outputting the ink file according to claim 3,
wherein the metadata block is information associating a first group of the one or more pieces of first stroke data with the first metadata, and associating a second group of the one or more pieces of second stroke data with the second metadata.

5. The method of outputting the ink file according to claim 4,
wherein the stroke ids are assigned to the one or more pieces of first stroke data and the one or more pieces of second stroke data, respectively,
the first group is identified by the stroke id assigned to each of the one or more pieces of first stroke data, and
the second group is identified by the stroke id assigned to each of the one or more pieces of second stroke data.

6. The method of outputting the ink file according to claim 5,
wherein one or more of the stroke ids assigned to the one or more pieces of first stroke data are data formed from consecutive numbers,
one or more pieces of the stroke ids assigned to the one or more pieces of second stroke data are data formed from consecutive numbers,
the first group is identified by a start number and an end number of the one or more pieces of the stroke ids assigned to the one or more pieces of first stroke data, and
the second group is identified by a start number and an end number of the one or more pieces of the stroke ids assigned to the one or more pieces of second stroke data.

7. The method of outputting the ink file according to claim 1,
wherein the metadata is information formed by applying a determined conversion to input device identification information stored in one of the input devices.

8. The method of outputting the ink file according to claim 7,
wherein the step of generating the metadata includes converting the input device identification information into logical identification information of a determined number of bits, and then converting the logical identification information into the metadata.

9. The method of outputting the ink file according to claim 8,
wherein the step of converting the input device identification information into the logical identification information includes a processing that depends on a type of the one of the input devices.

10. The method of outputting the ink file according to claim 9,
wherein the step of generating the metadata includes:
a first step of extracting unique information of a varying number of bits based on a format of the input device identification information, wherein the format of the input device identification information is specified according to the type of the one of the input devices, and padding the extracted unique information with a number of bits specified according to the format to thereby generate unique information of a determined number of bits; and a second step of adding information indicative of the format to the unique information of the determined number of bits.

11. The method of outputting the ink file according to claim 10,
wherein the step of generating the metadata includes converting the input device identification information into the logical identification information after masking one or more bits in the input device identification information that distinguish a plurality of pen points from each other, wherein the one or more bits serve as identification information of the plurality of pen points.

12. The method of outputting the ink file according to claim 11,
wherein the step of generating the metadata includes adding information indicated by the one or more masked bits to the metadata.

13. The method of outputting the ink file according to claim 7,
wherein the step of generating the metadata includes using dummy data when the input device identification information cannot be obtained from the one of the input devices.

14. The method of outputting the ink file according to claim 8,
wherein the metadata is information formed by converting the logical identification information into a character string in reference to a character string table, which stores the logical identification information and the character string in association with each other.

15. The method of outputting the ink file according to claim 8,
wherein the metadata is a hash value obtained by inputting the logical identification information to a one-way function.

16. The method of outputting the ink file according to claim 8,
wherein the metadata is a Uniform Resource Name (URN) formed by adding determined information to the logical identification information.

17. The method of outputting the ink file according to claim 1,
wherein M is 2 or more,
the M pieces of stroke data each includes plural pieces of point data, and includes order information in association with each of the plural pieces of point data, and
the order information indicates relative rendering order between the plural pieces of point data stored in the M pieces of stroke data.

18. The method of outputting the ink file according to claim 17,
wherein trajectories of two pieces of stroke data generated simultaneously intersect each other.

19. A device for outputting an ink file, the device comprising:
a stroke data generator configured to generate pieces of stroke data on a basis of event data generated as an input device moves, and to encode the pieces of stroke data together with stroke identifications (ids), using a first encoding scheme involving data compression, into a first format specified by an application program;
a metadata generator configured to generate metadata identifying the input device; and
an ink file generator configured to generate a metadata block associating the metadata with the pieces of stroke data, wherein values of the stroke ids are associated with the metadata, to encode the metadata block including the values of the stroke ids, using a second encoding scheme different from the first encoding scheme, into a second format, which is an Extensible Markup Language (XML) format and is different from the first format, and to write the pieces of stroke data and the stroke ids encoded in the first encoding scheme and the metadata block including the values of the stroke ids encoded in the second encoding scheme to the ink file.

20. A computer-readable non-transitory medium including a program which, when loaded to a computer, causes the computer to:
generate pieces of stroke data on a basis of event data generated as an input device moves;
encode the pieces stroke data together with stroke identifications (ids), using a first encoding scheme involving data compression, into a first format specified by an application program;
generate metadata identifying the input device;
generate a metadata block associating the metadata with the pieces of stroke data, wherein values of the stroke ids are associated with the metadata;
encode the metadata block including the values of the stroke ids, using a second encoding scheme different from the first encoding scheme, into a second format, which is an Extensible Markup Language (XML) format and is different from the first format; and
write the pieces of stroke data and the stroke ids encoded in the first encoding scheme and the metadata block including the values of the stroke ids encoded in the second encoding scheme to the ink file.

\* \* \* \* \*